(12) United States Patent
Takaoka

(10) Patent No.: US 10,082,582 B2
(45) Date of Patent: Sep. 25, 2018

(54) INFORMATION PROCESSING APPARATUS FOR RECEPTION AND PROCESSING OF A POSITIONING SIGNAL

(75) Inventor: Tomohisa Takaoka, Kanagawa (JP)

(73) Assignee: Sony Corporation, Tokyo (JP)

( * ) Notice: Subject to any disclaimer, the term of this patent is extended or adjusted under 35 U.S.C. 154(b) by 880 days.

(21) Appl. No.: 13/604,917

(22) Filed: Sep. 6, 2012

(65) Prior Publication Data
US 2013/0099971 A1 Apr. 25, 2013

(30) Foreign Application Priority Data

Oct. 20, 2011 (JP) ................................. 2011-230984

(51) Int. Cl.
| | | |
|---|---|---|
| *G01S 19/34* | (2010.01) | |
| *G01S 19/24* | (2010.01) | |
| *G01S 19/48* | (2010.01) | |
| *G01S 5/02* | (2010.01) | |

(52) U.S. Cl.
CPC ............ *G01S 19/34* (2013.01); *G01S 5/0252* (2013.01); *G01S 19/24* (2013.01); *G01S 19/48* (2013.01)

(58) Field of Classification Search
CPC .......... G01S 19/34; G01S 19/26; G01S 19/25; G01S 19/252
See application file for complete search history.

(56) References Cited

U.S. PATENT DOCUMENTS

| | | | | |
|---|---|---|---|---|
| 6,240,366 B1 * | 5/2001 | Nagatsuma | ............. | G01S 19/52 342/357.42 |
| 6,313,786 B1 * | 11/2001 | Sheynblat | ............ | G01C 21/206 342/357.23 |
| 6,429,808 B1 * | 8/2002 | King | ...................... | G01S 19/05 342/357.44 |
| 6,750,813 B2 * | 6/2004 | Vargas-Hurlston | ......................... | H04W 64/006 342/357.4 |
| 7,920,092 B2 * | 4/2011 | Townsend | ............... | G01S 19/09 342/357.75 |
| 8,121,609 B2 * | 2/2012 | Bosnjakovic | ........... | G01S 19/06 455/456.1 |

(Continued)

FOREIGN PATENT DOCUMENTS

JP 2010-38712 2/2010

OTHER PUBLICATIONS

Goze et al."Secure User Plane Location (SUPL) Architecture for Assisted GPS (A-GPS)." IEEE, 2008, pp. 229-234.*

(Continued)

*Primary Examiner* — Gregory C. Issing
(74) *Attorney, Agent, or Firm* — Chip Law Group

(57) ABSTRACT

There is provided an information processing apparatus including a satellite positioning unit, an environment information acquiring unit, a reception information acquiring unit and an operation condition setting unit. The satellite positioning unit performs positioning based on a positioning signal received from a positioning satellite. The environment information acquiring unit acquires environment information unique to a current location. The reception information acquiring unit acquires reception information indicating a state of the positioning signal at the current location based on the environment information The operation condition setting unit sets an operation condition of the satellite positioning unit based on the reception information.

19 Claims, 14 Drawing Sheets

(56) References Cited

U.S. PATENT DOCUMENTS

| | | | | |
|---|---|---|---|---|
| 8,320,932 B2* | 11/2012 | Pinder | ................... | G01S 19/48 |
| | | | | 455/456.1 |
| 8,520,473 B2* | 8/2013 | Honda | ................... | G04R 20/04 |
| | | | | 368/14 |
| 8,964,510 B1* | 2/2015 | Lakhzouri | ............... | G01S 19/24 |
| | | | | 342/357.22 |
| 9,019,158 B2* | 4/2015 | Tsai et al. | ................ | 342/357.74 |
| 2007/0239813 A1* | 10/2007 | Pinder et al. | ................. | 708/270 |
| 2007/0275734 A1* | 11/2007 | Gaal | ....................... | G01S 19/25 |
| | | | | 455/456.6 |
| 2009/0160705 A1* | 6/2009 | Matsuzaki | ............. | G01S 19/14 |
| | | | | 342/357.52 |
| 2009/0192709 A1* | 7/2009 | Yonker | ................... | G01C 21/20 |
| | | | | 701/470 |
| 2009/0295629 A1* | 12/2009 | Haartsen et al. | ........ | 342/357.06 |
| 2009/0303117 A1* | 12/2009 | Boiero | ................... | G01S 5/0036 |
| | | | | 342/357.64 |
| 2010/0253577 A1* | 10/2010 | Fujiwara | ................. | H04W 4/02 |
| | | | | 342/357.42 |
| 2010/0328152 A1* | 12/2010 | Abraham | ............. | G01S 5/0036 |
| | | | | 342/357.64 |
| 2011/0140960 A1* | 6/2011 | Wirola | ................... | G01S 5/0063 |
| | | | | 342/357.42 |
| 2011/0156950 A1* | 6/2011 | Bhattacharya | ........ | G01S 5/0036 |
| | | | | 342/357.31 |

OTHER PUBLICATIONS

Navstar GPS User Equipment Introduction, Public Release Version, Chapter 1. Sep. 1996.*

* cited by examiner

FIG.10
(CONFIGURATION A)
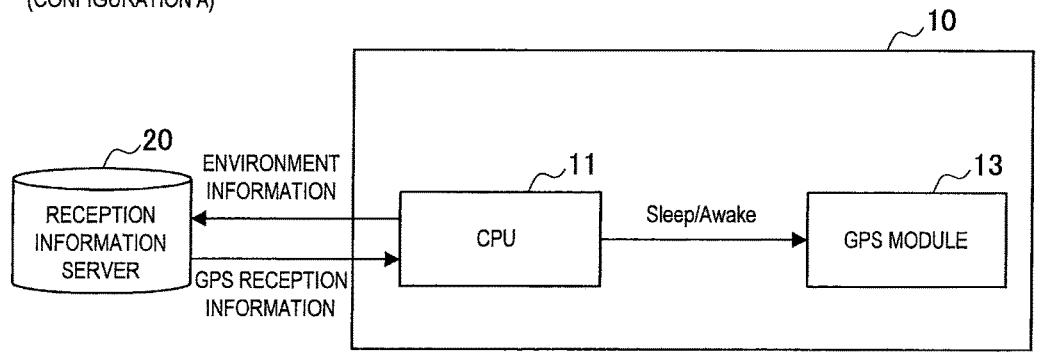
(CONFIGURATION B)
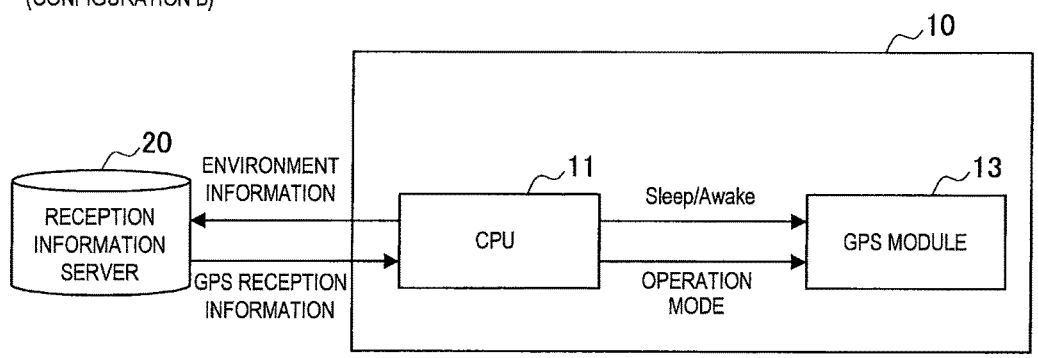
(CONFIGURATION C)
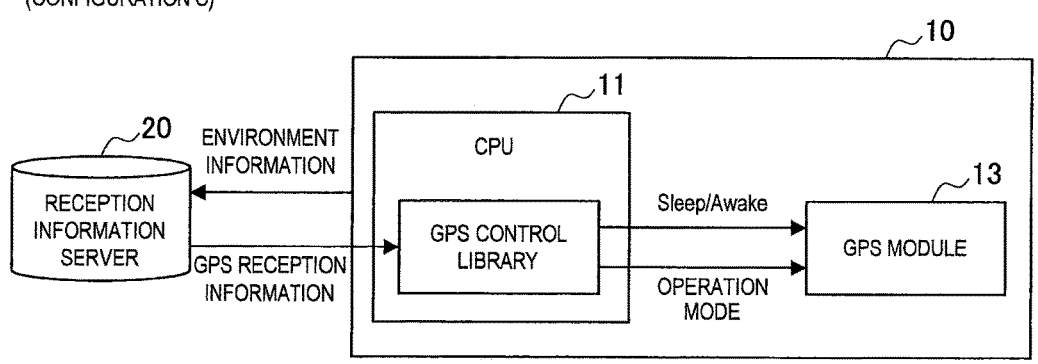

INFORMATION PROCESSING APPARATUS FOR RECEPTION AND PROCESSING OF A POSITIONING SIGNAL

BACKGROUND

The present disclosure relates to an information processing apparatus, a reception information server, an information processing method, a program, and a recording medium.

Portable information processing apparatuses having a positioning function have been widely used. Such portable information processing apparatuses are driven by secondary batteries. Therefore, power consumption is preferably reduced. In particular, the positioning function operated based on a positioning signal received from a positioning satellite consumes considerable power when searching for the positioning satellite.

Accordingly, Japanese Unexamined Patent Application Publication No. 2010-38712 discloses a position detection apparatus capable of reducing power consumption by stopping supplying power to a position detection unit when receiving no signal from a global positioning system (GPS) satellite, and then resuming supply of the power to the position detection unit when detecting that the position detection apparatus is outdoors through autonomous navigation.

SUMMARY

However, even when outdoors, the position detection apparatus may not actually perform positioning in an environment in which the sky is blocked such as in a street amid buildings, a wooded area, or the like. Further, when suitable operation conditions are set, positioning can be performed even at a location at which the reception intensity of a satellite signal is weak. However, control is performed depending only on whether power is supplied.

It is desirable to provide an information processing apparatus, a reception information server, an information processing method, a program, and a recording medium capable of reducing power consumption by performing positioning based on an operation condition suitable for each location.

According to an embodiment of the present disclosure, there is provided an information processing apparatus including a satellite positioning unit that performs positioning based on a positioning signal received from a positioning satellite, an environment information acquiring unit that acquires environment information unique to a current location, a reception information acquiring unit that acquires reception information indicating a state of the positioning signal at the current location based on the environment information, and an operation condition setting unit that sets an operation condition, under which the satellite positioning unit searches for the positioning satellite, based on the reception information.

In this configuration, before a positioning result is obtained by the satellite positioning unit, a broad range of the current location can be specified based on the environment information, and the reception information indicating the reception state of the positioning signal of the current location acquired based on the environment information can be acquired. By setting the operation condition of the satellite positioning unit based on the reception information, the satellite positioning unit is able to perform the positioning under the operation condition suitable for the current location.

According to an embodiment of the present disclosure, there is provided a reception information server including a storage unit that stores information by which environment information unique to a predetermined location is associated with reception information indicating a reception state of a positioning signal from a positioning satellite at the location, and a reception information notification unit that notifies of the reception information associated with the environment information in response to a request to acquire the reception information including the environment information.

According to an embodiment of the present disclosure, there is provided an information processing method including acquiring environment information unique to a current location, acquiring reception information indicating a state of a positioning signal at the current location based on the environment information, setting an operation condition used for a satellite positioning unit to search for a positioning satellite based on the reception information, and performing positioning based on the positioning signal received from the positioning satellite under the operation condition.

According to an embodiment of the present disclosure, there is provided a program causing a computer to function as an information processing apparatus including a satellite positioning unit that performs positioning based on a positioning signal received from a positioning satellite, an environment information acquiring unit that acquires environment information unique to a current location, a reception information acquiring unit that acquires reception information indicating a state of the positioning signal at the current location based on the environment information, and an operation condition setting unit that sets an operation condition, under which the satellite positioning unit searches for the positioning satellite, based on the reception information.

According to an embodiment of the present disclosure, there is provided a computer-readable recording medium recording a program causing a computer to function as an information processing apparatus including a satellite positioning unit that performs positioning based on a positioning signal received from a positioning satellite, an environment information acquiring unit that acquires environment information unique to a current location, a reception information acquiring unit that acquires reception information indicating a state of the positioning signal at the current location based on the environment information, and an operation condition setting unit that sets an operation condition, under which the satellite positioning unit searches for the positioning satellite, based on the reception information.

According to the embodiments of the present disclosure described above, the power consumption can be reduced under the operation condition more suitable for each location at which the positioning is performed.

BRIEF DESCRIPTION OF THE DRAWINGS

FIG. 10 is a diagram illustrating examples of the configurations of the positioning apparatus and the operation conditions to be set according to the embodiment;

DETAILED DESCRIPTION OF THE EMBODIMENTS

Figure 1:
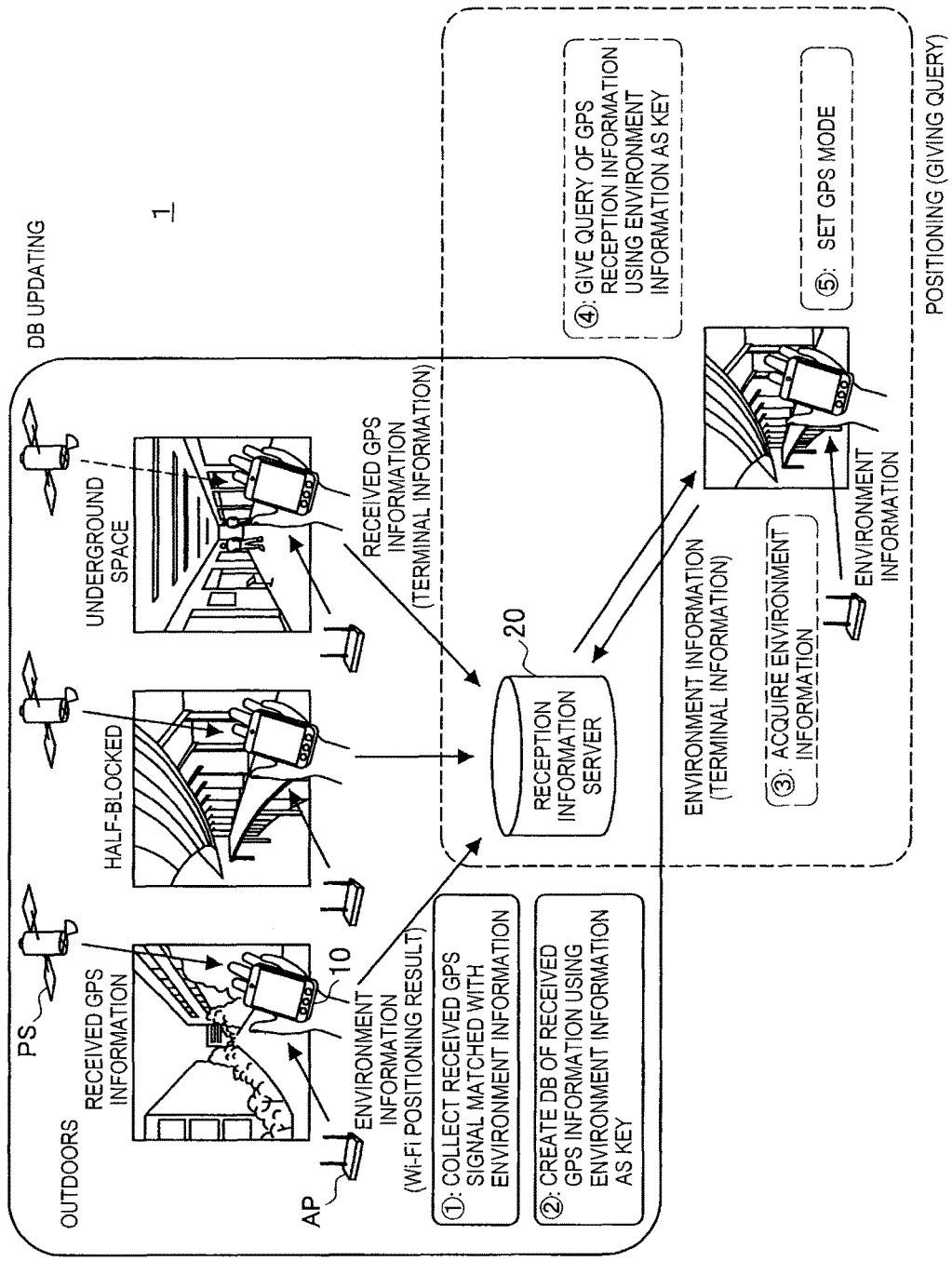
FIG. 1 is a diagram illustrating an overview of a positioning system according to an embodiment of the present disclosure.

Hereinafter, preferred embodiments of the present disclosure will be described in detail with reference to the accompanying drawings. Throughout the specification and the drawings, the same reference numerals are given to the constituent elements having substantially the same function, and the description thereof will not be repeated.

The description will be made in the following order.
1. Overview
2. Functional Configuration
3. Examples of Operations of System
4. Examples of Operations of Reception Information Server
5. Setting of Operation Condition
6. Example of Hardware Configuration 1. Overview First, an overview of a positioning system according to an embodiment of the present disclosure will be described with reference to FIG. 1. FIG. 1 is a diagram illustrating the overview of the positioning system according to the embodiment of the present disclosure.

As described above, the reception state of a positioning signal from a positioning satellite PS is different depending on a location. Accordingly, according to the embodiment of the present disclosure, a database in which reception information regarding the positioning signal from the positioning satellite PS at each location is associated with environment information used to specify the location is suggested. For example, FIG. 1 shows an example of a database constructed by acquiring GPS reception information at each location and using a Wi-Fi positioning result, which is the environment information, as a key.

Then, a positioning apparatus 10 acquires the environment information when acquiring position information, and gives a query to a reception information server 20 that has a database of the reception information. At this time, the positioning apparatus 10 can query GPS reception information using the acquired environment information as a key. Then, the positioning apparatus 10 can set operation conditions based on the acquired reception information.

The positioning apparatus 10 can set the operation conditions by switching between ON and OFF (Awake and Sleep) of a positioning function. For example, at a location at which it is difficult for the positioning apparatus 10 to receive a positioning signal, the positioning apparatus 10 can disable the positioning function of GPS (Sleep). Thus, the positioning apparatus 10 can reduce power consumption of the positioning apparatus 10 unnecessarily searching for a GPS satellite at a location at which it is difficult for the positioning apparatus 10 to perform positioning by GPS. Further, the positioning apparatus 10 can set the operation conditions by selecting and setting one of predetermined operation modes. For example, at a location at which the positioning apparatus 10 can receive a positioning signal with high intensity, the positioning apparatus 10 can set a mode for strong-signal searching of preferentially searching for the positioning signal with high intensity. At a location at which it can be known that the positioning signal with high intensity can be received, it is more efficient to search for a phase in which correlation is obtained at the subsequent frequency rather than to perform high-sensitivity searching of continuously adding a positioning signal with low intensity for a long time, when no correlation is obtained within a predetermined time. Therefore, at a location at which a positioning signal with high intensity can be received, power consumption can be reduced by searching for only a positioning signal with high intensity without performing the high-sensitivity searching.

The overview of the positioning system 1 according to the embodiment of the present disclosure has been described. Hereinafter, the details of the positioning system 1 realizing functions to be described here will be described.

2. Functional Configuration

Figure 2:
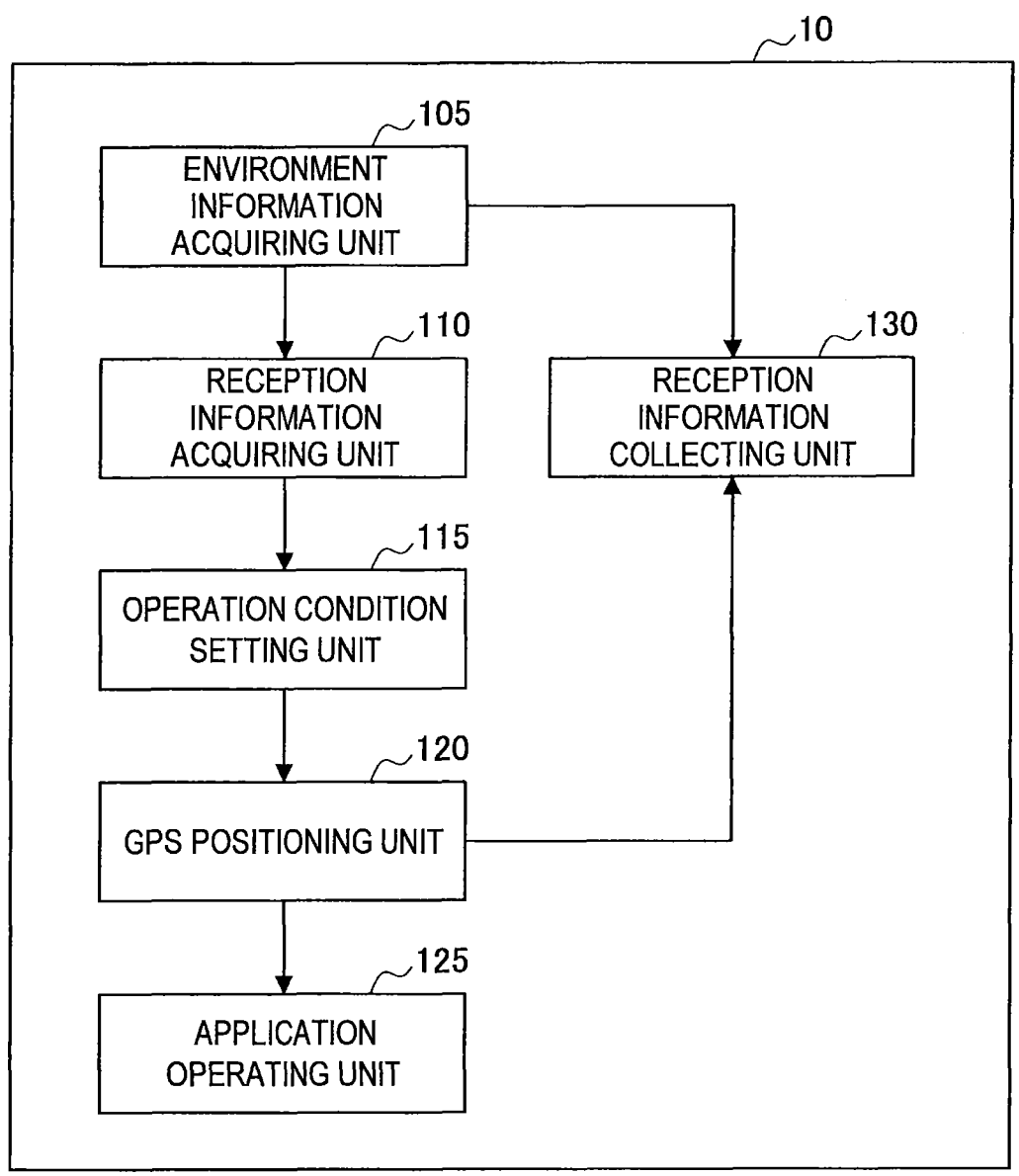
FIG. 2 is a block diagram illustrating a functional configuration of a positioning apparatus according to the embodiment.
Figure 3:
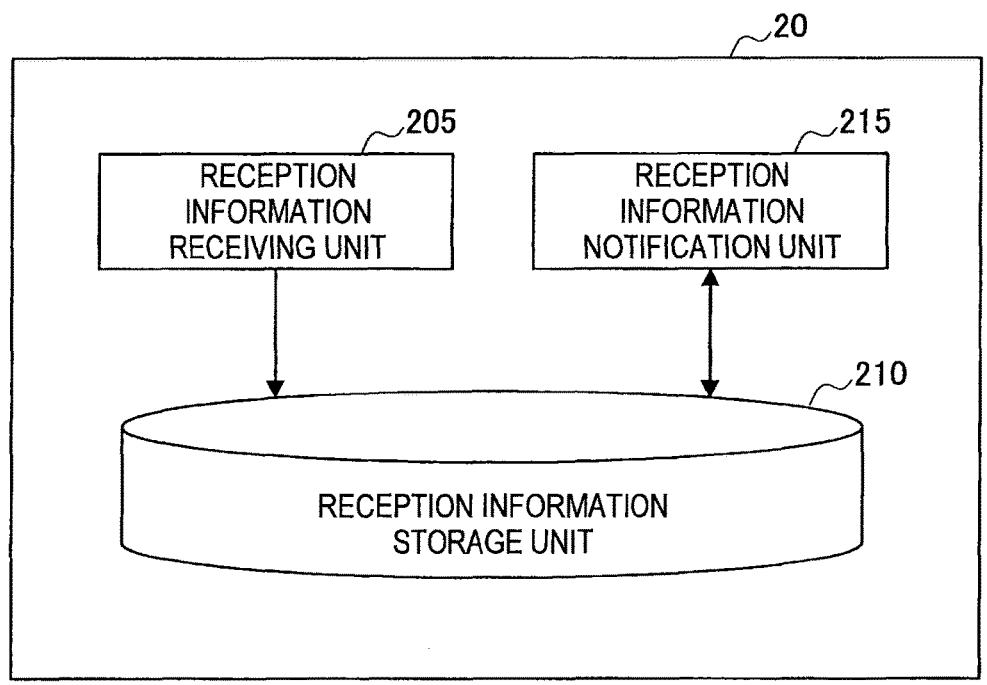
FIG. 3 is a block diagram illustrating a functional configuration of a reception information server according to the embodiment.

Next, the functional configurations of the positioning apparatus 10 and the reception information server 20 of the positioning system 1 according to an embodiment of the present disclosure will be described with reference to FIGS. 2 and 3. FIG. 2 is a block diagram illustrating the functional configuration of the positioning apparatus according to the embodiment. FIG. 3 is a block diagram illustrating the functional configuration of the reception information server according to the embodiment.

Positioning Apparatus 10

The positioning apparatus 10 is an example of an information processing apparatus that has a function of performing positioning based on a positioning signal from the positioning satellite PS. Here, a case in which a GPS satellite is used as an example of a positioning satellite will be described, but the embodiment of the present disclosure is not limited thereto. For example, a positioning satellite other than a GPS satellite may be used. The positioning apparatus 10 may be a cellular phone including, for example, a smart phone. Further, the positioning apparatus 10 may be a navigation apparatus including a personal navigation device (PND) or an information processing apparatus such as a personal computer (PC), a portable music reproduction apparatus, a portable game console, or a portable video processing apparatus. The positioning apparatus 10 may be applicable to all kinds of information processing apparatuses having a positioning function.

The positioning apparatus 10 mainly includes an environment information acquiring unit 105, a reception information acquiring unit 110, an operation condition setting unit 115, a GPS positioning unit 120, an application operating unit 125, and a reception information collecting unit 130.

Environment Information Acquiring Unit 105

The environment information acquiring unit 105 has a function of acquiring environment information unique to a location. The environment information is information that is used to specify a location. For example, the environment information may be information that is acquired in accordance with a method other than a positioning method using a positioning satellite. Further, the environment information may be position information that is used when position information is acquired in accordance with a method other than the positioning method using a positioning satellite. For example, when the positioning apparatus 10 has a Wi-Fi positioning function, the environment information may be position information acquired through Wi-Fi positioning. At this time, the environment information may be identification information of an access point seen at the location. Further, when the positioning apparatus 10 has a positioning function of a radio frequency identification (RFID) tag, the environment information may be position information that is acquired through positioning using the RFID tag. At this time, the environment information may be identification information of the RFID tag. Further, when the positioning apparatus 10 has a positioning function of using television or frequency modulation (FM) broadcast waves, the environment information may be position information that is acquired using television or FM broadcast waves. At this time, the environment information may be broadcast-wave intensity information.

Check-in information in a service using the position information may be used as the environment information. At this time, the environment information acquiring unit 105 can acquire, as the environment information, position information of a store or the like at which a user checks in. Further, when the positioning apparatus 10 has a positioning function based on an environment sound, the environment information may be position information that is acquired through positioning based on the environment sound. At this time, the environment sound may be used as the environment information. The environment information acquiring unit 105 can supply the acquired environment information to the reception information acquiring unit 110 and the reception information collecting unit 130.

Reception Information Acquiring Unit 110

The reception information acquiring unit 110 has a function of acquiring the reception information based on the environment information acquired by the environment information acquiring unit 105. The reception information acquiring unit 110 can acquire the reception information from, for example, the reception information server 20. Here, the case in which the reception information server 20 collecting the reception information acquired by the plurality of positioning apparatuses 10 is used has been described, but the embodiment of the present disclosure is not limited thereto. For example, the reception information acquiring unit 110 may receive the reception information using the environment information as a key from a reception information database included in the positioning apparatus 10. At this time, when the reception information database is generated based on the reception information collected by the positioning apparatus 10 itself, the reception information is acquired with higher accuracy. Even at the same location, the reception states of the positioning apparatuses 10 may be different in some cases. However, when the reception information database is generated based on the reception information collected by the positioning apparatus 10 itself, the advantage of improving accuracy of the reception information can be obtained since there is no influence of individual differences between the positioning apparatuses. Conversely, when the reception information database is generated based on the reception information collected by the positioning apparatus 10 itself, reception information regarding a location that a user of the positioning apparatus 10 has not visited may be difficult to obtain. Accordingly, the reception information acquiring unit 110 can acquire the reception information even at a location that the user of the positioning apparatus 10 has not visited by acquiring the reception information from the reception information server 20 that collects the reception information acquired by the plurality of positioning apparatuses 10. Further, the reception information acquiring unit 110 may acquire the reception information acquired by the same kind of terminal apparatus based on terminal information used to identify kinds of terminals. The reception information acquired by the same kind of terminal apparatus is considered to have fewer individual differences between the apparatuses. Accordingly, the accuracy of the reception information can be improved by narrowing down the acquired reception information to the reception information collected by the same kind of terminal apparatus. The reception information acquiring unit 110 can supply the acquired reception information to the operation condition setting unit 115.

The reception information can include the following information. For example, the reception information may include information indicating whether satellite positioning is possible at a location. The reception information may include information regarding the average reception level of positioning signals at each elevation angle and azimuth angle. The reception information may include information regarding an average signal intensity during tracking. The reception information may include information regarding the maximum and minimum signal intensities during tracking.

For example, the reception information acquiring unit 110 can acquire the reception information at the following timing. The reception information acquiring unit 110 may also acquire the reception information in response to a request from the GPS positioning unit 120. The reception information acquiring unit 110 may also acquire the reception information at a predetermined time interval. The reception information acquiring unit 110 may also acquire the reception information when the GPS positioning unit 120 does not perform positioning. The reception information acquiring unit 110 may also acquire the reception information when the positioning apparatus 10 operates or the GPS positioning unit 120 operates.

Operation Condition Setting Unit 115

The operation condition setting unit 115 has a function of setting an operation condition of the GPS positioning unit 120 based on the reception information supplied from the reception information acquiring unit 110. Here, the overview of searching performed to search for a GPS satellite by the GPS positioning unit 120 will be first described. The GPS positioning unit 120 first allocates satellites that search for a channel. The GPS positioning unit 120 searches for the satellite with high correlation between a designated frequency and a received signal. At this time, when the frequency is not suitable, the correlation is not obtained. Further, at a location at which the sky is blocked, the correlation is not obtained. When a received signal is weak, there is a possibility that the correlation will be obtained by performing the high-sensitivity searching of adding the positioning signal for a long time. Therefore, by setting a suitable operation condition depending on a location, the time of the searching of the satellites can be shortened (time to first fix (TTFF) is improved) and the power consumption can be accordingly reduced.

The operation condition setting unit 115 can set the operation condition such that the GPS positioning unit 120 does not perform the positioning, for example, when the reception information indicates that the current location is a location at which the GPS signal is difficult to receive. When it is known that the GPS signal is difficult to receive, the power consumption in an unnecessary searching operation can be reduced by not searching for the GPS satellite.

The operation condition setting unit 115 can set the operation condition such that the GPS positioning unit 120 preferentially searches for a GPS signal with high intensity, for example, when the reception signal indicates that the current location is a location at which the GPS signal with high intensity is able to be received. For example, specifically, the operation condition setting unit 115 may set the operation condition such that the GPS positioning unit 120 does not perform re-searching. Since the satellite that has not been discovered by performing the searching once is determined to be blocked and thus the re-searching is not performed, the power consumption is reduced. At this time, the operation condition setting unit 115 may set the operation condition such that the GPS positioning unit 120 does not perform the high-sensitivity searching of searching for the GPS signal with low intensity for a long time.

The operation condition setting unit 115 may set the operation condition such that the GPS positioning unit 120 initially performs the high-sensitivity searching when the reception signal indicates that the current location is a location at which the positioning is possible with the GPS signal with low intensity. By setting this operation condition, the TTFF is accordingly improved, since the unnecessarily strong-signal searching is not performed when it is known beforehand that the current location is a location at which the GPS signal with high intensity is difficult to receive.

The operation condition setting unit 115 can also set a different operation condition suitable for each GPS satellite such that the GPS positioning unit 120 operates under the different condition when it is known that the reception signal indicates a location at which the GPS signal with high intensity and the GPS signal with low intensity are both present. At this time, when the reception information includes information regarding a signal intensity at each elevation angle and azimuth angle, the operation condition setting unit 115 may set an operation condition suitable for each elevation angle and azimuth angle of the satellite to be searched. When the reception information indicates that a distribution of the state of the GPS signal at the current location is broad, that is, the reception information indicates that the reception state of the GPS signal varies, the operation condition setting unit 115 may set the operation condition based on predetermined information indicating whether the positioning accuracy is preferred or the power consumption is preferred. There is a probability that the same environment information may be acquired both outdoors and indoors near, for example, the entrance of a building. In this case, there is a probability the contents of the reception information may vary. For example, when the reception information server 20 gives a reply indicating a boundary in this case and the user configures the positioning apparatus beforehand such that the positioning accuracy is preferred, the operation condition setting unit 115 can set the operation condition such that the GPS positioning unit 120 operates at the high positioning accuracy. Conversely, when the user configures the positioning apparatus beforehand such that reduction in the power consumption is preferred, the operation condition setting unit 115 can set the operation condition such that the GPS positioning unit 120 does not operate.

GPS Positioning Unit 120

The GPS positioning unit 120 is an example of a satellite positioning unit that performs positioning based on a positioning signal from a positioning satellite. The GPS positioning unit 120 performs the positioning based on a GPS signal received from a GPS satellite. The GPS positioning unit 120 can operate under the operation condition set by the operation condition setting unit 115.

Application Operating Unit 125

The application operating unit 125 has a function of performing an operation of an application using the position information. The application operating unit 125 may have a navigation function of guiding a path of a destination based on, for example, the position information. The application operating unit 125 may also have a life-log function of recording position information. The application operating unit 125 may also have a function of supplying a user with information corresponding to the position information. The application operating unit 125 may also have function of assigning position tag information to an image. The application operating unit 125 may control the accuracy, frequency, or the like of the acquired position information depending on the function of an application to be operated.

Reception Information Collecting Unit 130

The reception information collecting unit 130 has a function of collecting the reception information indicating the reception state of a GPS signal of the GPS positioning unit 120. The reception information collecting unit 130 can collect the environment information at a given location and the reception information for the time at which this environment information is acquired, and then associate the environment information with the reception information. The reception information collecting unit 130 may store the collected reception information in, for example, an internal storage unit of the positioning apparatus 10. The reception information collecting unit 130 may also upload the collected reception information to the reception information server 20. The reception information collected by the reception information collecting unit 130 may include information indicating whether the positioning is possible at a location, information regarding an average reception level at each elevation angle and azimuth angle, information regarding an average signal intensity during tracking, and information regarding the maximum and minimum signal intensities during tracking. The reception information collecting unit 130 may also acquire the reception information, when the environment information is acquired. The reception information collecting unit 130 may also acquire the reception information when the environment information is changed. The reception information collecting unit 130 may also acquire the reception information periodically. The reception information collecting unit 130 may also transmit all of the acquired reception information to the reception information server 20 or may transmit the reception information to the reception information server 20 only when the acquired reception information is changed. A timing at which the reception information collecting unit 130 updates an internal reception information database in the reception information server 20 or the positioning apparatus 10 may be combined with the above-mentioned timings.

Reception Information Server 20

The reception information server 20 is an information processing apparatus that has a function of collecting the reception information acquired by the plurality of positioning apparatuses 10 and has a function of supplying the reception information in response to requests from the positioning apparatuses 10.

Referring to FIG. 3, the reception information server 20 mainly includes a reception information receiving unit 205, a reception information storage unit 210, and a reception information notification unit 215.

Reception Information Receiving Unit 205

The reception information receiving unit 205 has a function of receiving the reception information collected by the positioning apparatus 10 and storing the reception information in the reception information storage unit 210. The reception information receiving unit 205 receives the environment information used to specify a location and the reception information associated with this environment information. The reception information receiving unit 205 may also receive, for example, information used to specify a kind of positioning apparatus 10 acquiring the reception information. The reception information receiving unit 205 may also receive information (for example, a name or a version) used to specify a kind of GPS receiver of the positioning apparatus 10 acquiring the reception information. The reception information receiving unit 205 may create a reception information database, for example, for each kind of position apparatus 10. The reception information receiving unit 205 may create a reception information database, for example, for each kind of GPS receiver of the positioning apparatus 10. The reception information receiving unit 205 may evaluate a difference between the reception sensitivities of the kinds of positioning apparatuses 10 or the kinds of receivers of the positioning apparatuses 10, perform correction and standardization, and then create the reception database.

Reception Information Storage Unit 210

The reception information storage unit 210 has a function of storing the reception information associated with the environment information. The reception information storage unit 210 may serve as a database that stores the reception information received by the reception information receiving unit 205.

Reception Information Notification Unit 215

The reception information notification unit 215 has a function of extracting the reception information in response to a request from the positioning apparatus 10 and notifying the positioning apparatus 10 of the extracted reception information. The positioning apparatus 10 transmits both the environment information used as a key and a request to acquire the reception information to the reception information server 20. The reception information notification unit 215 can extract the reception information from the reception information storage unit 210 using the environment information received together with this request as a key. When the reception information storage unit 210 stores the information regarding a kind of positioning apparatus 10 or the information regarding a kind of the GPS receiver together with the reception information, the reception information notification unit 215 may receive the information regarding the kind of positioning apparatus 10 or the information regarding the kind of GPS receiver from the positioning apparatus 10 and extract the reception information in accordance with the received information regarding the kind of positioning apparatus 10 or the received information regarding the kind of GPS receiver.

The examples of the functions of the positioning apparatus 10 and the reception information server 20 according to this embodiment have been described. Each of the constituent elements described above may be configured by a general unit or circuit or may be configured by hardware specialized for the function of each constituent element. Further, the function of each constituent element may be realized by reading a control program from a storage medium, such as a read-only memory (ROM) or a random access memory (RAM) that stores the control program describing a processing sequence in which an arithmetic unit such as a central processing unit (CPU) executes the function, and then by analyzing and executing the control program. Accordingly, the configuration of each unit may be appropriately changed in accordance with a technical level at a time at which this embodiment is realized.

A computer program realizing each of the functions of the positioning apparatus 10 and the reception information server 20 according to this embodiment described above may be created and mounted on a personal computer or the like. Further, a computer-readable recording medium storing such a computer program can be provided. Examples of the recording medium include a magnetic disk, an optical disc, a magneto-optical disc, and a flash memory. The computer program may be delivered via, for example, a network without using a recording medium.

3. Examples of Operations of System

Figure 4:
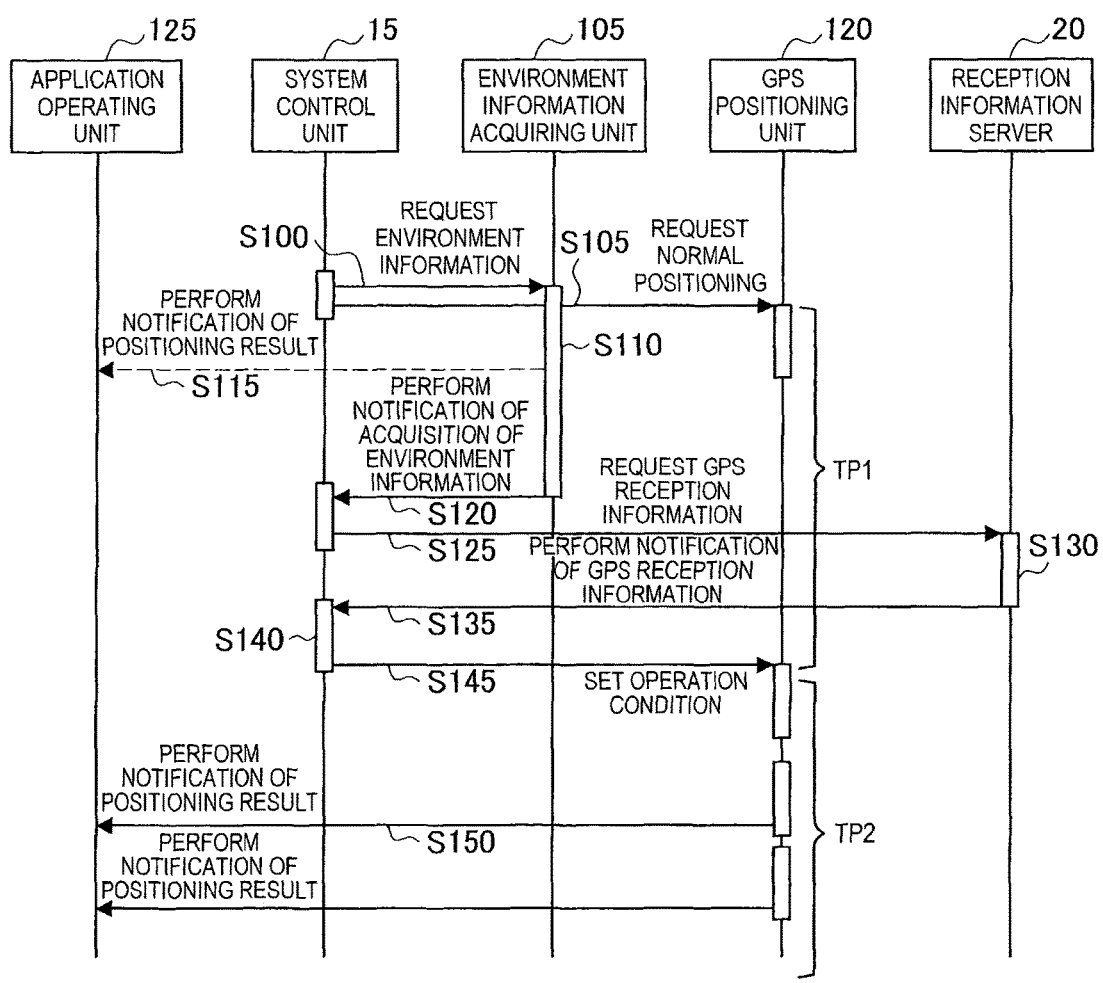
FIG. 4 is a diagram illustrating a sequence of exemplary operations when the positioning system has an application function of requesting a continuous operation, such as navigation, and has a reference for TTFF according to the embodiment.
Figure 5:
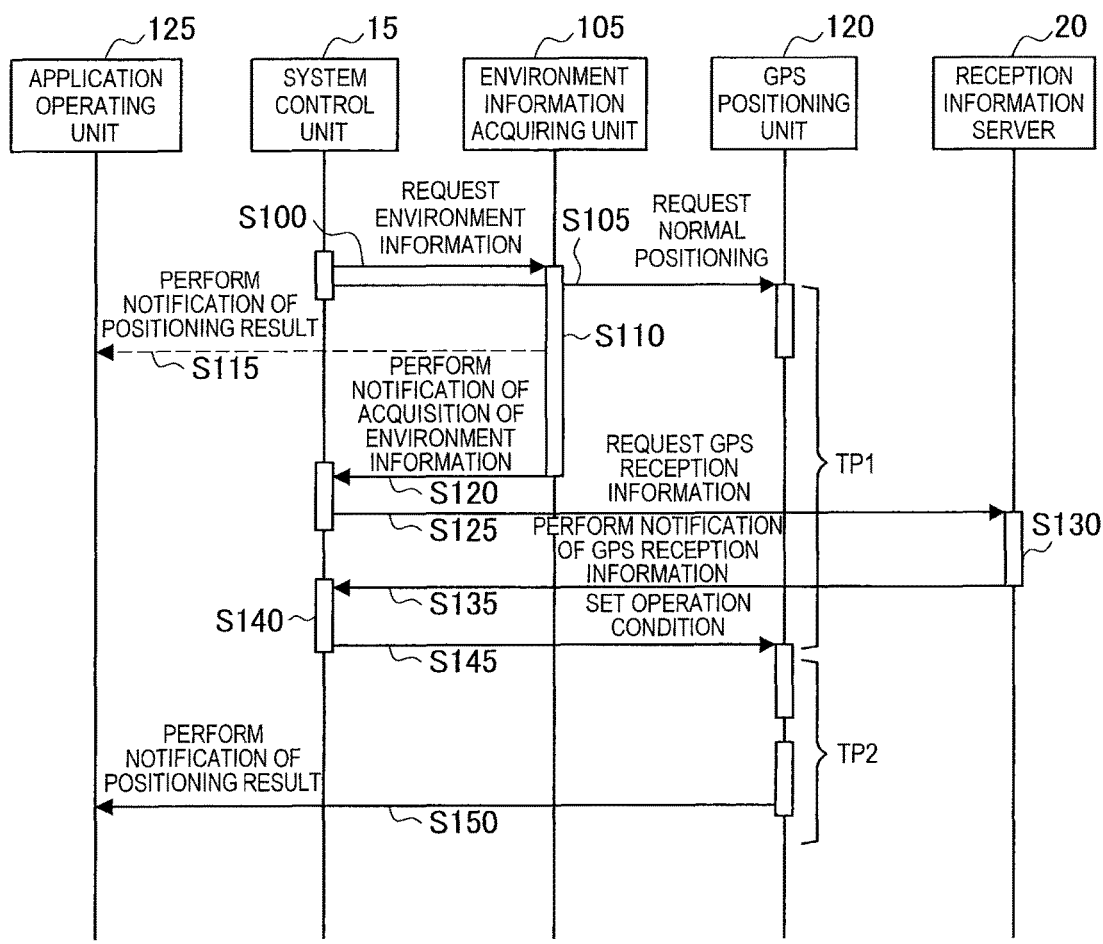
FIG. 5 is a diagram illustrating a sequence of exemplary operations when the positioning system has an application function of requesting single positioning request to assign a position tag to an image and has a reference for TTFF according to the embodiment.
Figure 6:
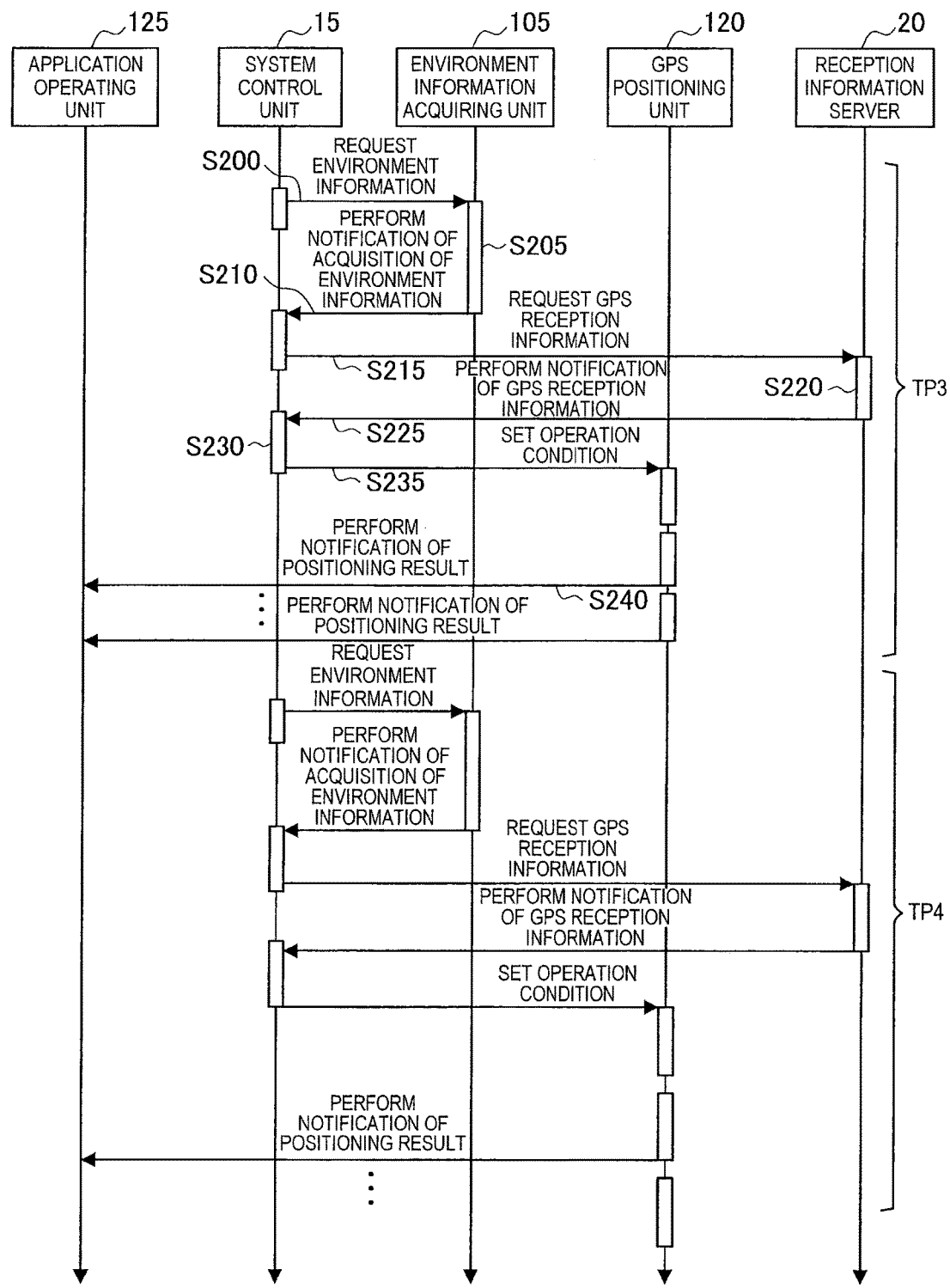
FIG. 6 is a diagram illustrating a sequence of exemplary operations when the positioning system has an application function of requesting a continuous operation, such as navigation, and has no reference for TTFF according to the embodiment.
Figure 7:
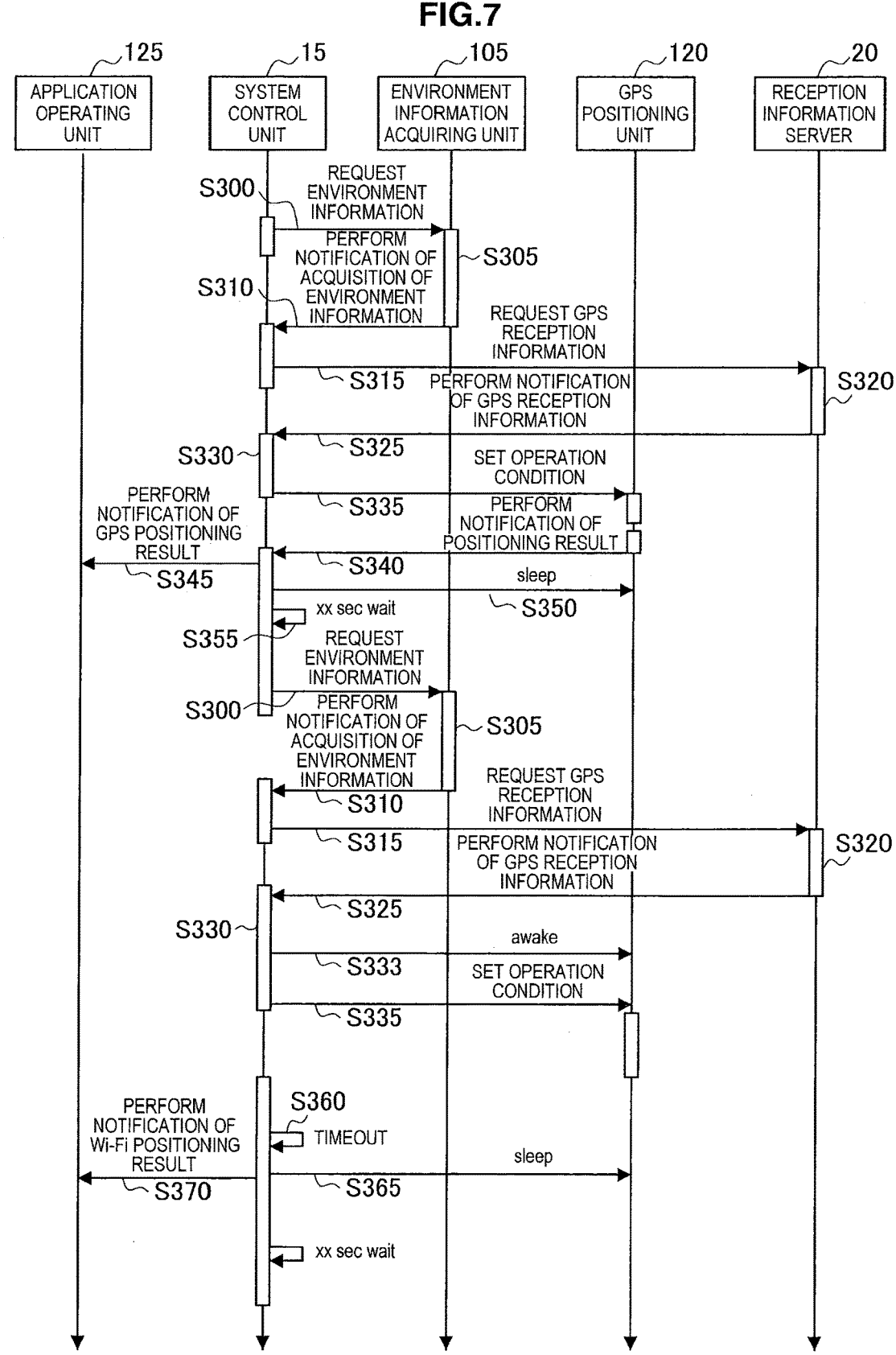
FIG. 7 is a diagram illustrating a sequence of exemplary operations when the positioning system has an application function of requesting intermittent positioning according to the embodiment.

Next, an example of a system operation of the positioning system 1 according to an embodiment of the present disclosure will be described with reference to FIGS. 4 to 7. FIG. 4 is a diagram illustrating a sequence of exemplary operations when the positioning system according to this embodiment has an application function of requesting a continuous operation, such as navigation, and has a reference for TTFF. FIG. 5 is a diagram illustrating a sequence of exemplary operations when the positioning system according to this embodiment has an application function of requesting single positioning to assign a position tag to an image and has a preference for TTFF. FIG. 6 is a diagram illustrating a sequence of exemplary operations when the positioning system according to this embodiment has an application function of requesting a continuous operation, such as navigation, and has no reference for TTFF. FIG. 7 is a diagram illustrating a sequence of exemplary operations when the positioning system according to this embodiment has an application function of requesting intermittent positioning.

Hereinafter, a case in which the reception information server 20 includes the reception information database therein will be described, but the embodiment of the present disclosure is not limited thereto. The positioning apparatus 10 may include the reception information database therein.

First, an example shown in FIG. 4 will be described. FIG. 4 shows an operation of the positioning system 1, for example, when the application operating unit 125 has an application function of requesting a continuous positioning operation, such as a navigation function. Since TTFF is preferred in the example of FIG. 4, normal positioning (an operation of searching for a GPS satellite under a standard operation condition) is performed until acquisition of the reception information.

A system control unit 15 first requests environment information from the environment information acquiring unit 105 (S100). Then, the system control unit 15 requests the GPS positioning unit 120 to start normal positioning (S105). The GPS positioning unit 120 starts the normal positioning in response to this request. On the other hand, the environment information acquiring unit 105 acquires the environment information (S110). Here, the environment information is assumed to be position information obtained by Wi-Fi positioning. When the application operating unit 125 desires to acquire the position information quickly, the environment information acquiring unit 105 may supply the position information as the positioning result to the application operating unit 125 (S115).

The environment information acquiring unit 105 notifies the system control unit 15 of the acquired environment information (S120). Then, the system control unit 15 requests the GPS reception information together with the acquired environment information from the reception information server 20 (S125). The reception information server 20 extracts the GPS reception information from the database in response to this request (S130). At this time, the reception information server 20 can extract the GPS reception information using the received environment information as a key. Then, the reception information server 20 notifies the system control unit 15 of the extracted GPS reception information (S135).

Subsequently, the system control unit 15 determines the operation condition to be set in the GPS positioning unit 120 based on the received GPS reception information (S140). Then, the system control unit 15 sets the determined operation condition in the GPS positioning unit 120 (S145). The GPS positioning unit 120 starts searching for a GPS satellite under the set operation condition. When the GPS positioning unit 120 can acquire the position information, the GPS positioning unit 120 notifies the application operating unit 125 of the positioning result (S150). For example, when the application operating unit 125 has a navigation function, the position information is continuously requested. Thus, the GPS positioning unit 120 can continuously acquire the position information and notify the application operating unit 125 of the positioning result.

Accordingly, the GPS positioning unit 120 is requested to start the normal positioning at first and starts searching for the GPS satellite under the standard operation condition, until the operation condition based on the GPS reception information is set (period TP1). For example, the GPS positioning unit 120 may start the positioning during the period TP1 in an environment in which a signal with high intensity can be acquired. The GPS positioning unit 120 can search for the GPS satellite under the set operation condition in a period TP2 after the operation condition based on the GPS reception information is set. When TIFF is not preferred, the GPS positioning unit 120 may be set to be in the sleep state during the period TP1. The case in which the environment information is used as the positioning result in step S115 has been described, but the embodiment of the present disclosure is not limited thereto. For example, in accordance with the accuracy of the position information necessary for the application operating unit 125, it may be determined whether the environment information (Wi-Fi positioning result) is transmitted as the positioning result or the application operating unit is not notified of the positioning result until the acquisition of the GPS positioning result.

Next, the description will be made with reference to FIG. 5. FIG. 5 shows an exemplary operation when the position information is acquired in response to a request of an application having a function of assigning position tag information to, for example, a photo. In this case, acquisition of the position information is intermittently requested. The same reference numerals in FIG. 4 are given to the same contents of the steps and the detailed description thereof will not be repeated. In the example of FIG. 5, the application operating unit 125 may set a predetermined period and may await the positioning result of the GPS until the predetermined period elapses in step S115. When the GPS positioning is difficult to perform within the predetermined period, the application operating unit 125 may be notified of the environment information as the positioning result.

Next, the description will be made with reference to FIG. 6. FIG. 6 shows exemplary operations when the application operating unit 125 requests a continuous operation, for example, when the application operating unit 125 has a navigation function or the like.

The system control unit 15 requests environment information from the environment information acquiring unit 105 (S200). Then, the environment information acquiring unit 105 acquires the environment information (S205). The environment information acquiring unit 105 notifies the system control unit 15 of the acquired environment information (S210). Next, the system control unit 15 requests GPS reception information from the reception information server 20 (S215). At this time, the system control unit 15 can request the GPS reception information using the acquired environment information as a key. The reception information server 20 extracts the GPS reception information using the received environment information as a key in response to this request (S220). The reception information server 20 notifies the system control unit 15 of the extracted GPS reception information (S225). The system control unit 15 having acquired the GPS reception information determines the operation condition set in the GPS positioning unit 120 based on the GPS reception information (S230). Then, the system control unit 15 sets the determined operation condition in the GPS positioning unit 120 (S235). The GPS positioning unit 120 starts the positioning under the set operation condition. When the GPS positioning unit 120 can perform the positioning, the GPS positioning unit 120 notifies the application operating unit 125 of the positioning result (S240).

The operations of step S200 to step S240 described above are repeated. Here, the positioning and the notification of the positioning result during a period TP3 (S240) may be performed simultaneously in parallel with the operations of step S200 to step S235 during a period TP4. For example, the operation condition can be set to be suitable for the current location by acquiring the environment information and the GPS reception information periodically and setting the operation condition again.

Next, the description will be made with reference to FIG. 7. FIG. 7 shows a case in which the application operating unit 125 requests an intermittent operation (for example, an operation of performing positioning once over several minutes). In this case, a time of TTFF until the positioning is not considered to be a problem. Accordingly, at this time, the GPS positioning unit 120 may operate after the environment information is acquired.

The system control unit 15 requests environment information from the environment information acquiring unit 105 (S300). The environment information acquiring unit 105 acquires the environment information in response to this request (S305). The environment information acquiring unit 105 notifies the system control unit 15 of the acquired environment information (S310). The system control unit 15 requests GPS reception information from the reception information server 20 using the acquired environment information as a key (S315). The GPS reception information server 20 extracts the GPS reception information in response to this request using the received environment information as a key (S320). The GPS reception information server 20 notifies the system control unit 15 of the extracted GPS reception information (S325).

The system control unit 15 determines the operation condition to be set in the GPS positioning unit 120 based on the acquired GPS reception information (S330). Then, the system control unit 15 sets the determined operation condition in the GPS positioning unit 120 (S335). The GPS positioning unit 120 starts the positioning under the set operation condition. Then, the GPS positioning unit 120 notifies the system control unit 15 of the positioning result (S340). The system control unit 15 notifies the application operating unit 125 of the GPS positioning result (S345).

Once the positioning result can be obtained, the system control unit 15 sets the GPS positioning unit 120 such that the GPS positioning unit 120 is in the sleep state (S350). Then, the system control unit 15 sets the GPS positioning unit 120 such that the GPS positioning unit 120 waits for a predetermined time (S355). When the set predetermined time elapses, the system control unit 15 requests the environment information from the environment information acquiring unit 105 again (S300). Then, when the operation condition to be newly set in the GPS positioning unit 120 is determined by performing the operations of step S300 to step S330, the system control unit 15 activates the GPS positioning unit 120 (S333). Then, when the system control unit 15 sets the operation condition again (S335), the GPS positioning unit 120 starts the positioning under the set operation condition.

Here, the system control unit 15 may set a time limit of the predetermined time. In this case, when the predetermined time has elapsed but the GPS positioning result is not obtained during the predetermined time (S360), the system control unit 15 notifies the application operating unit 125 of the Wi-Fi positioning result (S370). The system control unit 15 sets the GPS positioning unit 120 in the sleep state (S365), the system control unit 15 sets the GPS positioning unit 120 such that the GPS positioning unit 120 waits for the predetermined time again.

The exemplary operation of the positioning system 1 has been described in the plurality of patterns. The operation of the reception information server and the operation of setting the operation condition in the GPS positioning unit 120 will be described in detail below.

4. Examples of Operations of Reception Information Server

Figure 8:
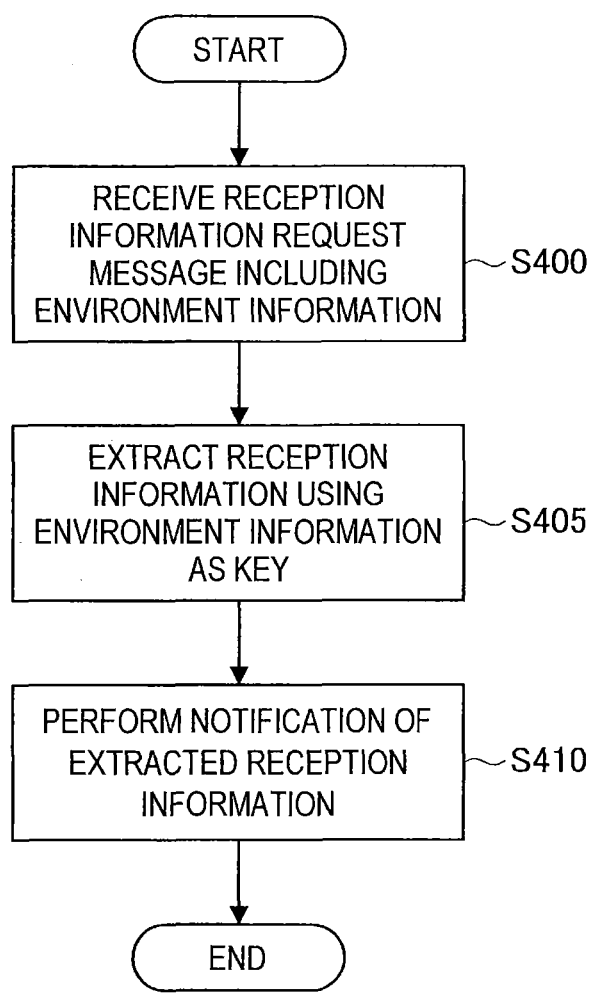
FIG. 8 is a flowchart illustrating exemplary operations of the reception information server according to the embodiment.
Figure 9:
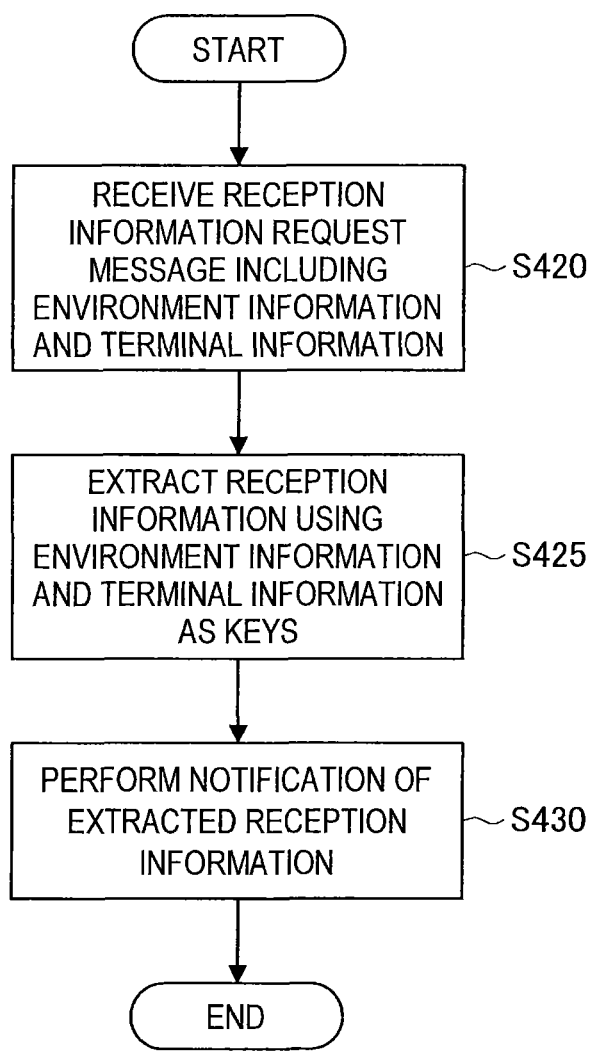
FIG. 9 is a flowchart illustrating other exemplary operations of the reception information server according to the embodiment.

Next, exemplary operations of the reception information server 20 according to an embodiment of the present disclosure will be described with reference to FIGS. 8 and 9. FIG. 8 is a flowchart illustrating exemplary operations of the reception information server according to the embodiment. FIG. 9 is a flowchart illustrating other exemplary operations of the reception information server according to the embodiment.

First, referring to FIG. 8, the reception information server 20 receives a reception information request message including the environment information (S400). Then, the reception information server 20 extracts the reception information using the received environment information as a key (S405). The reception information server 20 notifies the positioning apparatus 10, which has transmitted the reception information request message, of the extracted reception information (S410).

Next, referring to FIG. 9, the reception information server 20 receives the reception information request message including the environment information and the terminal information of the positioning apparatus 10 (S420). Then, the reception information server 20 extracts the reception information using the received environment information and the received terminal information as keys (S425). The reception information server 20 notifies the positioning apparatus 10, which has transmitted the reception information request message, of the extracted reception information (S430).

Thus, the reception information server 20 may extract the reception information using the terminal information as the key in addition to the environment information. Further, the reception information server 20 may extract the reception information using a kind of GPS module (the GPS positioning unit 120) as a key (not shown). Thus, the GPS positioning unit 120 can set the operation condition more suitably by extracting the reception information in accordance with the performance of the positioning apparatus 10.

5. Setting of Operation Condition

Figure 11:
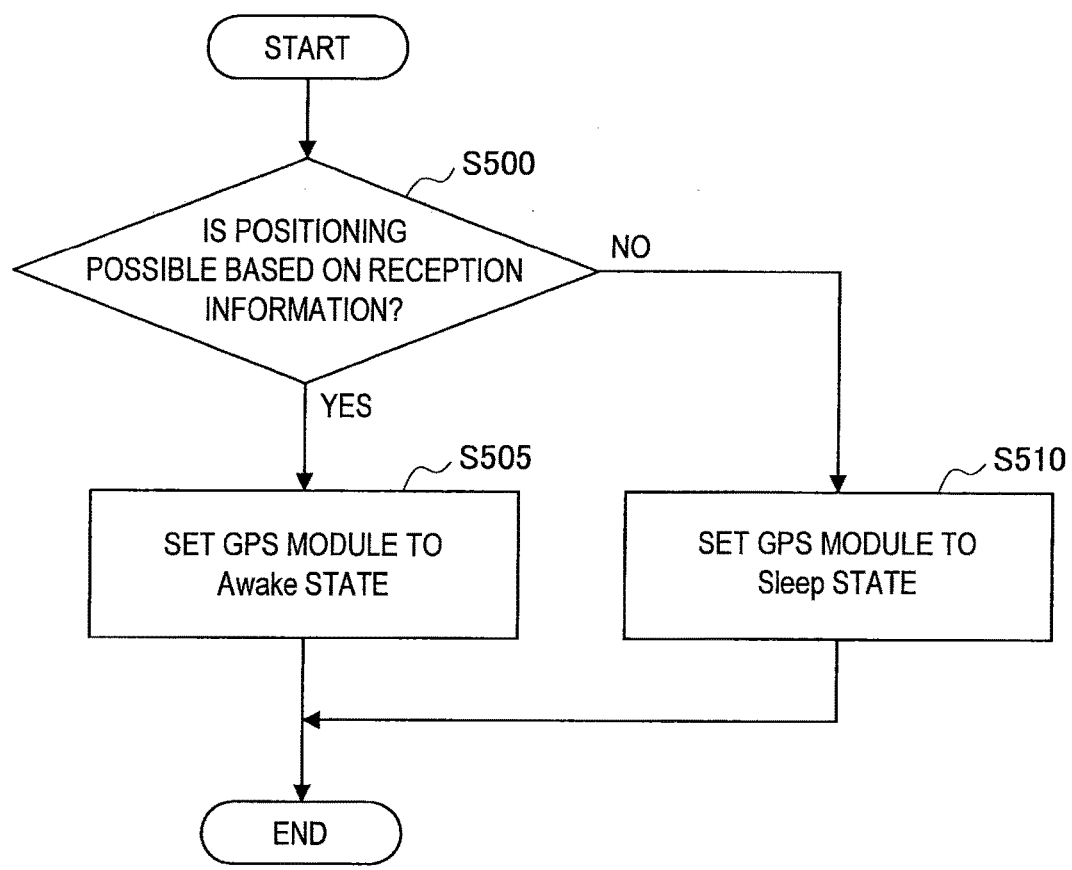
FIG. 11 is a flowchart illustrating an exemplary operation of setting a positioning condition of the positioning apparatus according to the embodiment.
Figure 12:
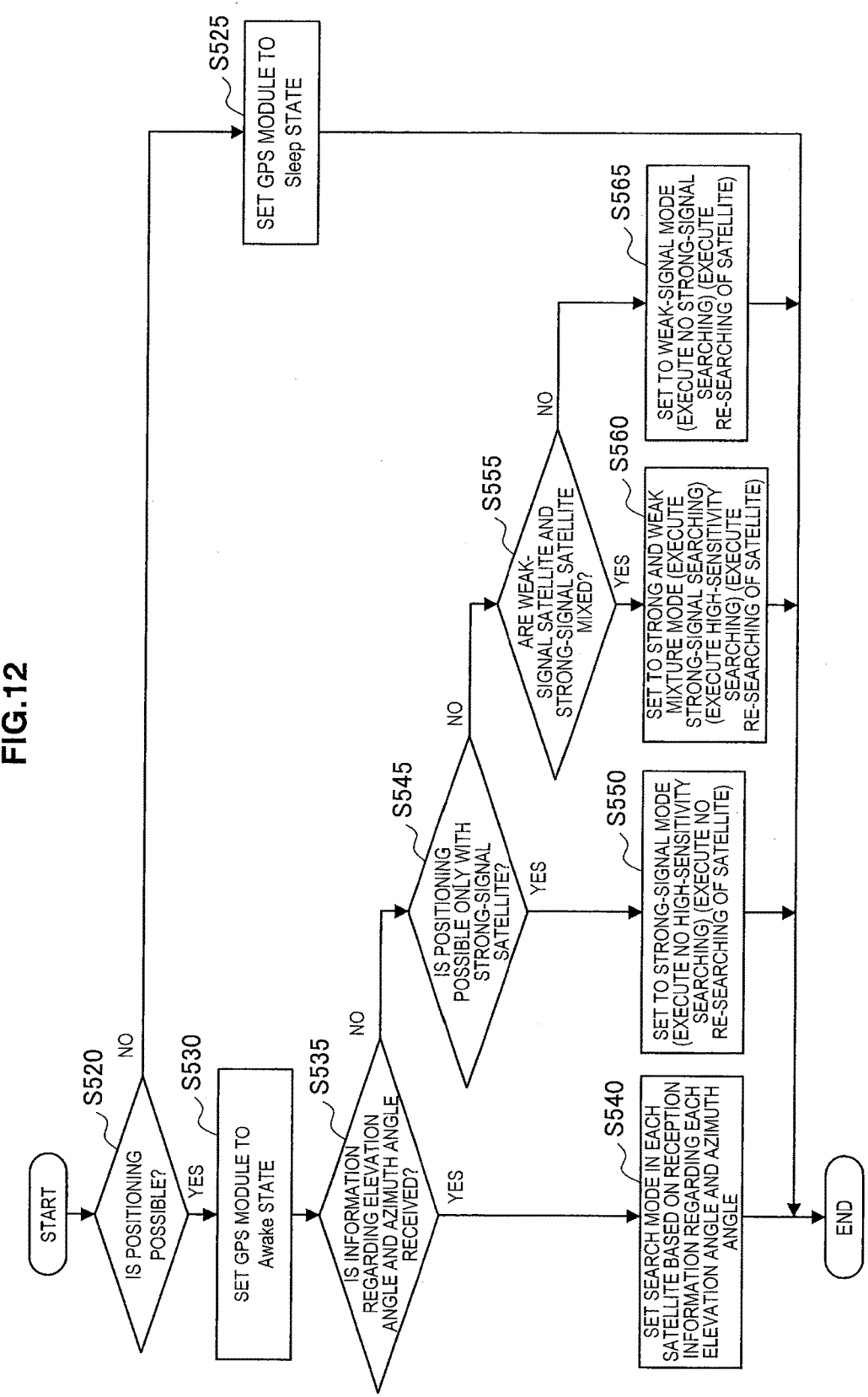
FIG. 12 is a flowchart illustrating another exemplary operation of setting the positioning condition of the positioning apparatus according to the embodiment.

Next, an operation of setting the operation condition of the positioning apparatus 10 according to an embodiment of the present disclosure will be described with reference to FIGS. 10 to 12. FIG. 10 is a diagram illustrating examples of the configurations of the positioning apparatus according to the embodiment and the operation conditions to be set. FIG. 11 is a flowchart illustrating an exemplary operation of setting a positioning condition of the positioning apparatus according to the embodiment. FIG. 12 is a flowchart illustrating another exemplary operation of setting the positioning condition of the positioning apparatus according to the embodiment.

The description will be made first with reference to FIG. 10. FIG. 10 shows Configuration A, Configuration B, and Configuration C of the positioning system 1. For example, the positioning apparatus 10 may include a CPU 11 (the system control unit 15 is realized by the function of the CPU 11) and a GPS module 13. At this time, the GPS module 13 in Configuration A controls ON and OFF and does not receive setting of the operation condition. In this case, when the CPU 11 acquires the GPS reception information from the reception information server using the environment information as a key, the CPU 11 instructs a Sleep state or Awake state of the GPS module 13 based on the GPS reception information.

In Configuration B, the GPS module 13 can control ON and OFF and also receive the setting of the operation condition. Accordingly, when the CPU 11 acquires the GPS reception information from the reception information server 20, the CPU 11 can instruct the Sleep state or the Awake state of the GPS module 13 and set an operation mode of the GPS module 13 based on the acquired GPS reception information.

When the positioning apparatus 10 includes a GPS control library, as in Configuration C, the GPS control library can set the Sleep state, the Awake state, and the operation mode.

For example, when the GPS module 13 can merely receive the control of ON and OFF, as in Configuration A, the GPS module 13 may perform an operation shown in FIG. 11. Based on the reception information, the positioning apparatus 10 determines whether the current location is a location at which the positioning is possible (S500). When the positioning can be performed, the CPU 11 sets the GPS module 13 such that the GPS module 13 is in the Awake state. Conversely, when the current location is a location in which the positioning is difficult to perform, the CPU 11 sets the GPS module 13 such that the GPS module 13 is in the Sleep state.

When the GPS module 13 can receive setting of an operation mode other than the Sleep state and the Awake state, as in Configuration B and Configuration C, the CPU 11 first determines whether the current location is a location at which the positioning is possible based on the GPS reception information (S520) as shown in FIG. 12. When the CPU 11 determines that the current location is not the location at which the positioning is possible, the CPU 11 sets the GPS module 13 such that the GPS module 13 is in the Sleep state (S525).

Conversely, when the CPU 11 determines that the current location is the location at which the positioning is possible, the CPU 11 sets the GPS module 13 such that the GPS module 13 is in the Awake state (S530). Next, the CPU 11 determines whether information regarding the elevation angle and the azimuth angle can be received (S535). When the CPU 11 determines that the information regarding the elevation angle and the azimuth angle can be received, the CPU 11 sets the GPS module 13 such that the GPS module 13 searches for each satellite in a different search mode based on the information regarding the elevation angle and the azimuth angle (S540). Conversely, when the CPU 11 determines that the information regarding the elevation angle and the azimuth angle is not received, the CPU 11 determines whether the current location is a location at which the positioning is possible only with a strong-signal satellite based on the reception information (S545). When the CPU 11 determines that the current location is the location at which the positioning is possible only with the strong-signal satellite in step S545, the CPU 11 sets the GPS module 13 such that the GPS module 13 is in a strong-signal mode (S550). In the strong-signal mode, the GPS module 13 performs neither the high-sensitivity searching nor the re-searching of searching for a satellite.

Further, based on the GPS reception information, the CPU 11 determines whether the current location is a location at which the positioning is possible with mixture of a weak-signal satellite and a strong-signal satellite (S555). When the CPU 11 determines that the current location is the location at which the positioning is possible with both the weak-signal satellite and the strong-signal satellite, the CPU 11 sets the GPS module 13 such that the GPS module 13 is in a strong and weak mixture mode (S550). Here, since the CPU 11 has no information regarding the elevation angle and the azimuth angle, the CPU 11 searches for a GPS satellite by combining the strong-signal searching, the high-sensitivity searching, and the re-searching of searching for a satellite.

Conversely, when the CPU 11 determines that the current location is the location at which the positioning is difficult with both the weak-signal satellite and the strong-signal satellite in step S555, the CPU 11 sets the GPS module 13 such that the GPS module 13 is in a weak-signal mode (S565). In the weak-signal mode, the GPS module 13 performs the high-sensitivity searching. In the weak-signal mode, the GPS module 13 performs the re-searching of the satellite without performing the storing-signal searching.

6. Example of Hardware Configuration

Figure 13:
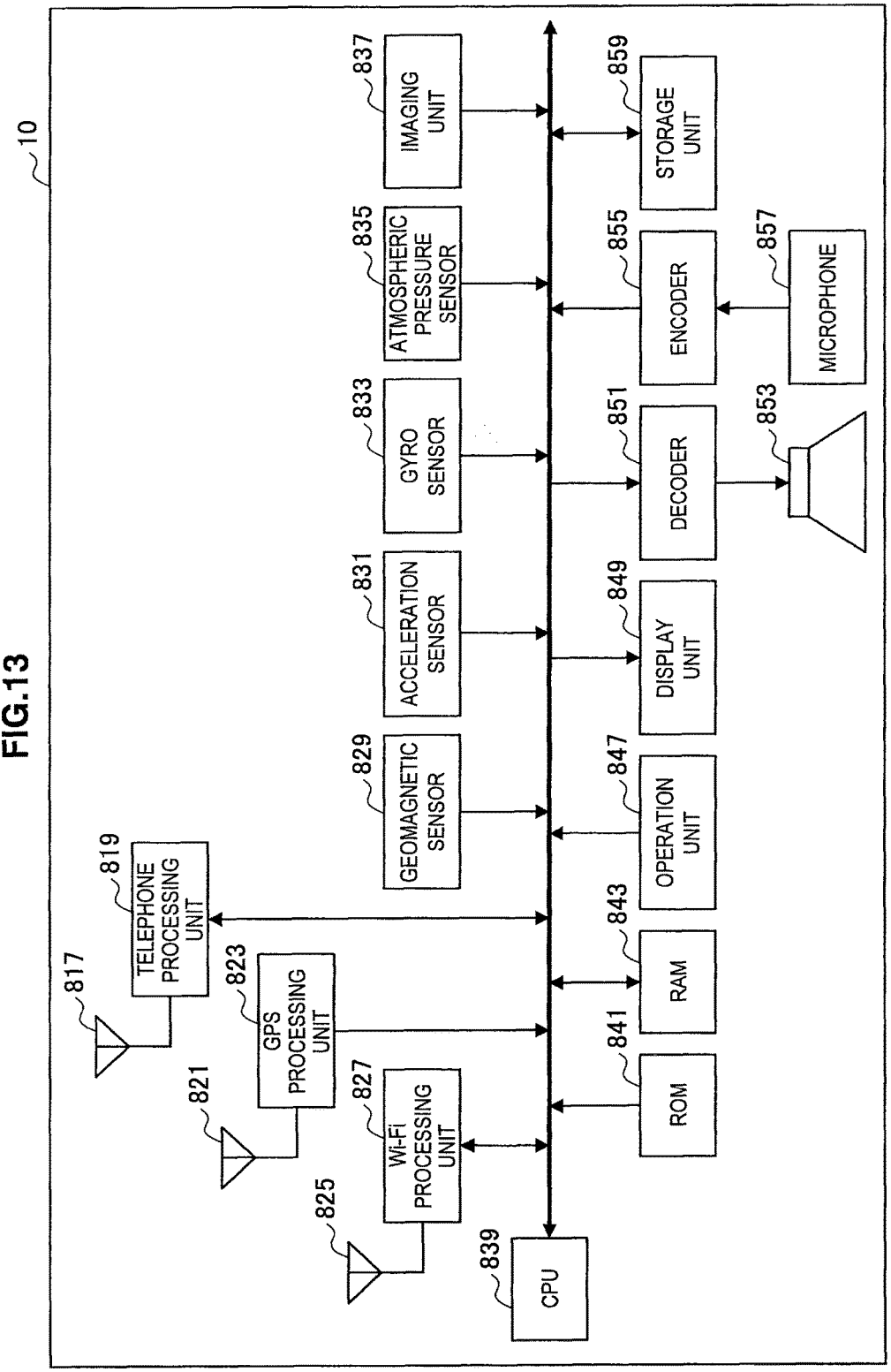
FIG. 13 is a block diagram illustrating an exemplary hardware configuration of the positioning apparatus according to the embodiment.
Figure 14:
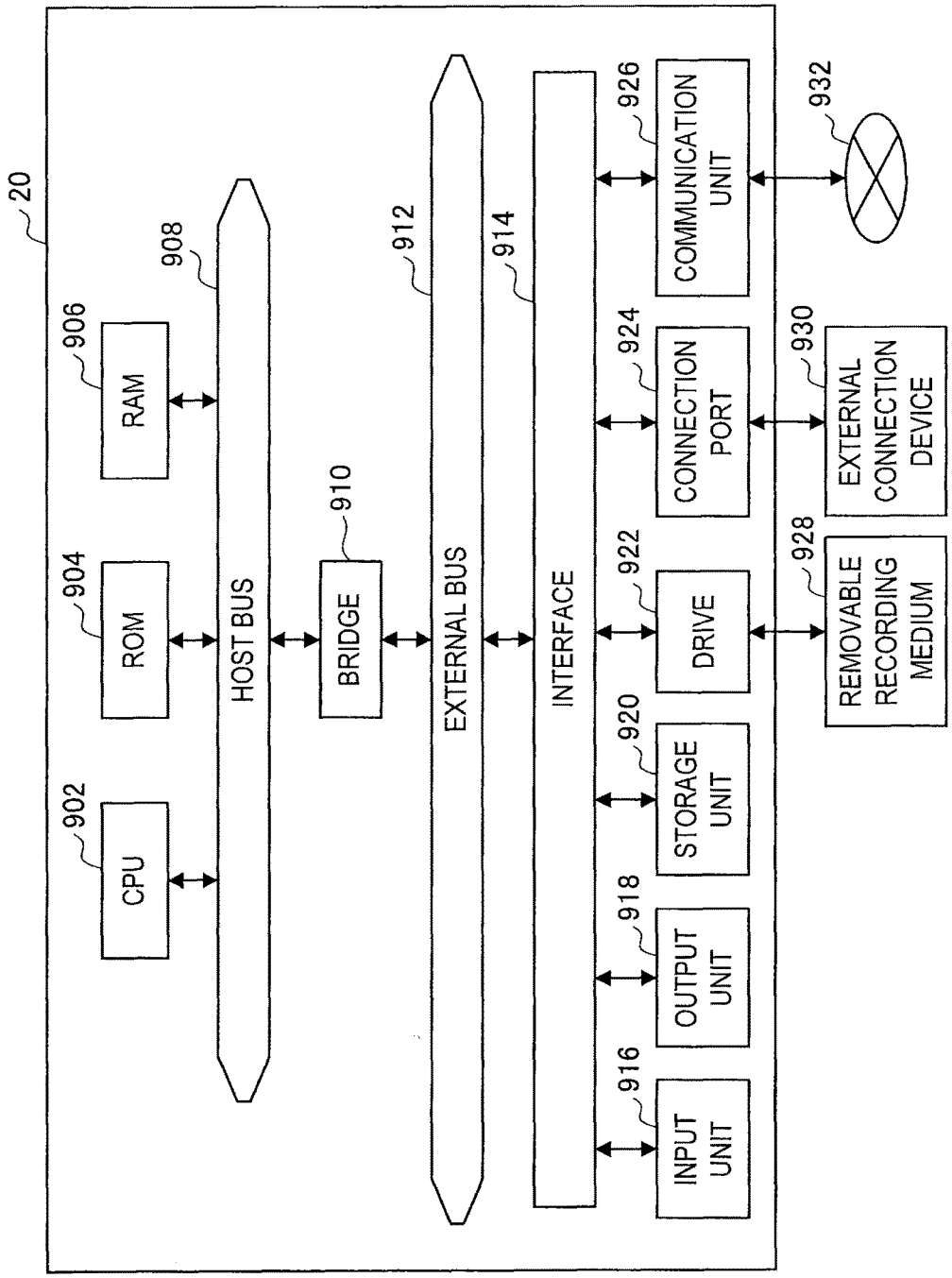
FIG. 14 is a block diagram illustrating an exemplary hardware configuration of the reception information server according to the embodiment.

Next, exemplary hardware configurations of the positioning apparatus 10 and the reception information sever 20 according to an embodiment of the present disclosure will be described with reference to FIGS. 13 and 14. FIG. 13 is a block diagram illustrating an exemplary hardware configuration of the positioning apparatus according to the embodiment. FIG. 14 is a block diagram illustrating an exemplary hardware configuration of the reception information server according to the embodiment.

Positioning Apparatus 10

Hereinafter, an example of the configuration of the positioning apparatus 10 will be described. Referring to FIG. 13, for example, the positioning apparatus 10 includes a telephone network antenna 817, a telephone processing unit 819, a GPS antenna 821, a GPS processing unit 823, a Wi-Fi antenna 825, a Wi-Fi processing unit 827, a geomagnetic sensor 829, an acceleration sensor 831, a gyro sensor 833, an atmospheric pressure sensor 835, an imaging unit 837, a CPU 839, a ROM 841, a RAM 843, an operation unit 847, a display unit 849, a decoder 851, a speaker 853, an encoder 855, a microphone 857, and a storage unit 859. The hardware configuration mentioned here is merely an example and some of the constituent elements may not be used. Further, constituent elements other than the constituent elements mentioned here may, of course, be added.

Telephone Network Antenna 817

The telephone network antenna 817 is an example of an antenna that has a function of making wireless connection with a portable telephone network for telephony and communication. The telephone network antenna 817 can supply a telephone signal received via the portable telephone network to the telephone processing unit 819.

Telephone Processing Unit 819

The telephone processing unit 819 has a function of performing various kinds of signal processing on signals transmitted and received through the telephone network antenna 817. The telephone processing unit 819 can perform various kinds of signal processing on a sound signal input through, for example, the microphone 857 and encoded by the encoder 855 and supply the processed sound signal to the telephone network antenna 817. Further, the telephone processing unit 819 can perform various kinds of signal processing on the sound signal supplied from the telephone network antenna 819 and supply the processed sound signal to the decoder 851.

GPS Antenna 821

The GPS antenna 821 is an example of an antenna that receives a signal from a positioning satellite. Since the GPS antenna 821 is able to receive GPS signals from a plurality of GPS satellites, the GPS antenna 821 inputs the received GPS signals to the GPS processing unit 823.

GPS Processing Unit 823

The GPS processing unit 823 is an example of a calculation unit that calculates position information based on a signal received from a positioning satellite. The GPS processing unit 823 calculates the current position information based on the plurality of GPS signals input from the GPS antenna 821 and outputs the calculated position information. Specifically, the GPS processing unit 823 calculates the position of each GPS satellite based on orbit data of each GPS satellite and calculates a distance between each GPS satellite and the positioning apparatus 10 based on a time difference between the transmission time and the reception time of the GPS signal. Then, the GPS processing unit 823 can calculate the current three-dimensional position based on the calculated position of each GPS satellite and the calculated distance between each GPS satellite and the positioning apparatus 10. The orbit data of the GPS satellite used here may be included in, for example, the GPS signal. The orbit data of the GPS satellite may be acquired from an external server via the communication antenna 825.

Wi-Fi Antenna 825

The Wi-Fi antenna 825 is an antenna that has a function of transmitting and receiving a communication signal to and from, for example, a wireless local area network (LAN) communication network in accordance with the specification of Wi-Fi. The Wi-Fi antenna 825 can supply the received signal to the Wi-Fi processing unit 827.

Wi-Fi Processing Unit 827

The Wi-Fi processing unit 827 has a function of performing various kinds of signal processing on the signal supplied from the Wi-Fi antenna 825. The Wi-Fi processing unit 827 can supply a digital signal generated from a supplied analog signal to the CPU 839.

Geomagnetic Sensor 829

The geomagnetic sensor 829 is a sensor that detects geomagnetism as a voltage value. The geomagnetic sensor 829 may be a triaxial geomagnetic sensor that detects geomagnetism in the X-axis direction, the Y-axis direction, and the Z-axis direction. The geomagnetic sensor 829 can supply the detected geomagnetism data to the CPU 839.

Acceleration Sensor 831

The acceleration sensor 831 is a sensor that detects acceleration as a voltage value. The acceleration sensor 831 may be a triaxial acceleration sensor that detects each of the acceleration in the X-axis direction, the acceleration in the Y-axis direction, and the acceleration in the Z-axis direction. The acceleration sensor 831 can supply the detected acceleration data to the CPU 839.

Gyro Sensor 833

The gyro sensor 833 is a kind of measurer that detects an angle or angular velocity of an object. The gyro sensor 833 may be a triaxial gyro sensor that detects speeds (angular velocities) at which rotational angles change about the X axis, the Y axis, and the Z axis. The gyro sensor 833 can supply the detected angular velocity data to the CPU 839.

Atmospheric Pressure Sensor 835

The atmospheric pressure sensor 835 is a sensor that detects a surrounding atmospheric pressure as a voltage value. The atmospheric pressure sensor 835 can detect an atmospheric pressure as a predetermined sampling frequency and supply the detected atmospheric pressure data to the CPU 839.

Imaging Unit 837

The imaging unit 837 has a function of photographing a still image or a video via a lens under the control of the CPU 839. The imaging unit 837 may store a photographed image in the storage unit 859.

CPU 839

The CPU 839 functions as an arithmetic processing device or a control device and controls general operations of a portable terminal 30 in accordance with various programs. The CPU 839 may be a microprocessor. The CPU 839 can realize various functions in accordance with various programs.

ROM 841 and RAM 843

The ROM 841 can store programs, calculation parameters, or the like to be used by the CPU 839. The RAM 843 can temporarily store programs to be used through execution of the CPU 839 or parameters or the like appropriately changed in the execution.

Operation Unit 847

The operation unit 847 has a function of generating an input signal used for a user 5 to perform a desired operation. The operation unit 847 may include an input unit, such as a touch sensor, a mouse, a keyboard, a button, a microphone, a switch, or a lever, which is used when the user 5 inputs information and an input control circuit that generates an input signal in response to an input operation of the user 5 and outputs the input signal to the CPU 839.

Display Unit 849

The display unit 849 is an example of an output device. The display unit 849 may be a display device such as a liquid crystal display (LCD) device or an organic light emitting diode (OLED) display device. The display unit 849 can supply information by displaying a screen for the user 5.

Decoder 851 and Speaker 853

The decoder 851 has a function of decoding input data and performing analog conversion or the like under the control of the CPU 839. The decoder 851 can perform decoding, analog conversion, or the like on sound data input via, for example, the telephone network antenna 817 and the telephone processing unit 819, and then output the processed sound signal to the speaker 853. The decoder 851 can perform decoding, analog conversion, or the like on sound data input via, for example, the Wi-Fi antenna 825 and the Wi-Fi processing unit 827, and then output the processed sound signal to the speaker 853. The speaker 853 can output sound based on the sound signal supplied from the decoder 851.

Encoder 855 and Microphone 857

The encoder 855 has a function of performing digital conversion, encoding, or the like on input data under the control of the CPU 839. The encoder 855 can perform digital conversion, encoding, or the like on a sound signal input from the microphone 857, and then output the sound data. The microphone 857 can collect sound and output the sound as a sound signal.

Storage Unit 859

The storage unit 859 is a device that stores data and may include a storage medium, a recording device that records the data on the storage medium, a reading device that reads the data from the storage medium, and a deletion device that deletes the data recorded on the storage medium. Examples of the storage medium include a non-volatile memory such as a flash memory, a magnetoresistive random access memory (MRAM), a ferroelectric random access memory (FeRAM), a phase change random access memory (PRAM), or an electronically erasable and programmable read-only memory (EEPROM), and a magnetic recording medium such as a hard disk drive (HDD).

Reception Information Server 20

Next, referring to FIG. 14, the functions of the constituent elements of the reception information server 20 described above can be realized, for example, by the hardware configuration shown in FIG. 14. That is, the functions of the constituent elements can be realized by controlling the hardware shown in FIG. 14 in accordance with a computer program.

As shown in FIG. 14, the hardware includes a CPU 902, a ROM 904, a RAM 906, a host bus 908, and a bridge 910 as main hardware units. The hardware further includes an external bus 912, an interface 914, an input unit 916, an output unit 918, a storage unit 920, a drive 922, a connection port 924, and a communication unit 926 as hardware units. "CPU" above is an abbreviation for "central processing unit." "ROM" above is an abbreviation for "read-only memory." "RAM" above is an abbreviation for "random access memory."

The CPU 902 functions as, for example, an arithmetic processing device or a control device and controls some or all of the operations of the constituent elements based on various programs recorded on the ROM 904, the RAM 906, the storage unit 920, or a removable recording medium 928. The ROM 904 is a unit that stores a program read by the CPU 902 or data or the like used for calculation. For example, the RAM 906 temporarily or permanently stores a program read by the CPU 902, or various parameters or the like appropriately changed when the program is executed.

For example, these constituent elements are connected to each other via the host bus 908 capable of transmitting data at a high speed. On the other hand, for example, the host bus 908 is connected to an external bus 912, which transmits data at a relatively low speed, via the bridge 910. A mouse, a keyboard, a touch panel, a button, a switch, a lever, or the like is used as the input unit 916. Further, a remote controller capable of transmitting a control signal using infrared rays or other radio waves is used as the input unit 916 in some cases.

A display device such as a CRT, an LCD, a PDP, or an ELD, an audio output device such as a speaker or a headphone, a printer, a portable telephone, a facsimile device, or the like can be used as the output unit 918 capable of notifying users of acquired information in a visual or auditory way. "CRT" above is an abbreviation for "cathode ray tube." "LCD" above is an abbreviation for "liquid crystal display." "PDP" above is an abbreviation for "plasma display panel." "ELD" above is an abbreviation "electroluminescence display."

The storage unit 920 is a device that stores various kinds of data. A magnetic storage device, such as an HDD, a semiconductor storage device, an optical storage device, a magneto-optical storage device, or the like is used as the storage unit 920. "HDD" above is an abbreviation for "hard disk drive."

The drive 922 is a device that reads information stored in the removable recording medium 928 such as a magnetic disk, an optical disc, a magneto-optical disc, or a semiconductor memory or writes information on the removable recording medium 928. Examples of the removable recording medium 928 include DVD media, Blu-ray media, HD DVD media, and various semiconductor storage media. Of course, examples of the removable recording medium 928 include IC cards on which a non-contact type IC chip is mounted or electronic apparatuses. "IC" above is an abbreviation for "integrated circuit."

The connection port 924 is a port that is connected to an external connection device 930 such as a USB port, an IEEE 1394 port, an SCSI, an RS-232C port, or an optical audio terminal. Examples of the external connection device 930 include a printer, a portable music player, a digital camera, a digital video camera, and an IC recorder. "USB" above is an abbreviation for "universal serial bus." "SCSI" above is an abbreviation for "small computer system interface."

The communication unit 926 is a communication device that is connected to a network 932. Examples of the communication unit 926 include a wired or wireless LAN, Bluetooth (registered trademark), a WUSB communication card, an optical communication router, an ADSL router, and various communication modems. Further, the network 932 connected to the communication unit 926 is configured by networks connected to each other in wired or wireless ways. The examples of the network 932 include the Internet, a household LAN, infrared communication, visible communication, broadcasting, and satellite communication. "LAN" above is an abbreviation for "local area network." "WUSB" above is an abbreviation for "wireless USB." "ADSL" above is an abbreviation for "asymmetric digital subscriber line."

The preferred embodiments of the present disclosure have been described in detail with reference to the accompanying drawings, but the technical scope of the present disclosure is not limited thereto. It should be apparent to those skilled in the art of the present disclosure that various modified examples or corrected examples are made within the scope of the technical spirit described in claims, and the modified examples or the corrected examples, of course, pertain to the technical scope of the present disclosure.

For example, in the above-described embodiments, the GPS satellite has been exemplified as a positioning satellite. However, the positioning satellite is not, of course, limited to the GPS satellite. The positioning satellite may be various positioning satellites such as Galileo, GLONASS, North Star, or Michibiki. At this time, one kind of satellite may be used as the positioning satellite or a combination of positioning signals from a plurality of kinds of satellites may be used. The configuration for acquiring the position information can be modified appropriately in accordance with the technical level when the configuration is realized.

In the specification, the steps descried in the flowcharts and sequences may be processed chronologically in the described order or may not necessarily be processed chronologically. The steps may be processed in parallel or separately. The order of the steps processed chronologically may, of course, be changed appropriately depending on a case.

Additionally, the present technology may also be configured as below.

(1) An information processing apparatus including:
a satellite positioning unit that performs positioning based on a positioning signal received from a positioning satellite;
an environment information acquiring unit that acquires environment information unique to a current location;
a reception information acquiring unit that acquires reception information indicating a state of the positioning signal at the current location based on the environment information; and
an operation condition setting unit that sets an operation condition of the satellite positioning unit based on the reception information.

(2) The information processing apparatus according to (1), wherein the reception information includes information regarding an azimuth at which the positioning signal is receivable at the current location, and
wherein the operation condition setting unit sets the operation condition such that the satellite positioning unit searches for the positioning satellite at the azimuth included in the reception information.

(3) The information processing apparatus according to (1) or (2),
wherein the reception information includes information regarding an elevation angle at which the positioning signal is receivable at the current location, and
wherein the operation condition setting unit sets the operation condition such that the satellite positioning unit searches for the positioning satellite at the elevation angle included in the reception information.

(4) The information processing apparatus according to any one of (1) to (3), wherein the operation condition setting unit sets the operation condition based on predetermined information indicating whether positioning accuracy is preferred or power consumption is preferred, when the reception information indicates that a distribution of the state of the positioning signal is broad at the current location.

(5) The information processing apparatus according to any one of (1) to (4), wherein the operation condition setting unit sets the operation condition such that the satellite positioning unit does not perform the positioning when the reception information indicates that the current location is a location at which the positioning signal is not receivable.

(6) The information processing apparatus according to any one of (1) to (5), wherein the operation condition setting unit sets the operation condition such that the satellite positioning unit preferentially searches for the positioning signal with high intensity when the reception information indicates that the current location is a location at which the positioning signal with the high intensity is receivable.

(7) The information processing apparatus according to (6), wherein the operation condition setting unit sets the operation condition such that the satellite positioning unit does not re-search the positioning satellite when the reception information indicates that the current location is a location at which the positioning signal with the high intensity is receivable.

(8) The information processing apparatus according to (6) or (7), wherein the operation condition setting unit sets the operation condition such that the satellite positioning unit does not perform high-sensitivity searching of searching for the positioning signal with low intensity for a long time when the reception information indicates that the current location is a location at which the positioning signal with the high intensity is receivable.

(9) The information processing apparatus according to any one of (1) to (8), wherein the operation condition setting unit sets the operation condition such that the satellite positioning unit does not perform strong-signal searching of searching for the positioning signal with high intensity when the reception information indicates that the current location is a location at which the positioning signal with the high intensity is not receivable.

(10) The information processing apparatus according to any one of (1) to (9), wherein the reception information acquiring unit further acquires the reception information based on terminal information specifying a kind of the information processing apparatus.

(11) The information processing apparatus according to any one of (1) to (9), further including:
a reception information collecting unit that collects the environment information and the reception information indicating the state of the positioning signal at a time of acquiring the environment information.

(12) The information processing apparatus according to (10), wherein the reception information acquiring unit acquires the reception information collected by the information processing apparatus.

(13) The information processing apparatus according to any one of (1) to (12), wherein the satellite positioning unit performs the positioning under a standard operation condition set in advance, until the operation condition based on the reception information is set.

(14) The information processing apparatus according to any one of (1) to (12), wherein the satellite positioning unit waits until the operation condition based on the reception information is set, and then the satellite positioning unit performs the positioning after the operation condition based on the reception information is set.

(15) A reception information server including:
a storage unit that stores information in which environment information unique to a predetermined location is associated with reception information indicating a reception state of a positioning signal from a positioning satellite at the location; and
a reception information notification unit that notifies of the reception information associated with the environment information in response to a request to acquire the reception information including the environment information.

(16) An information processing method including:
acquiring environment information unique to a current location;
acquiring reception information indicating a state of a positioning signal at the current location based on the environment information;
setting an operation condition used for a satellite positioning unit to search for a positioning satellite based on the reception information; and
performing positioning based on the positioning signal received from the positioning satellite under the operation condition.

(17) A program for causing a computer to function as an information processing apparatus including:
a satellite positioning unit that performs positioning based on a positioning signal received from a positioning satellite;
an environment information acquiring unit that acquires environment information unique to a current location;
a reception information acquiring unit that acquires reception information indicating a state of the positioning signal at the current location based on the environment information; and
an operation condition setting unit that sets an operation condition, under which the satellite positioning unit searches for the positioning satellite, based on the reception information.

(18) A computer-readable recording medium recording a program for causing a computer to function as an information processing apparatus including:
a satellite positioning unit that performs positioning based on a positioning signal received from a positioning satellite;
an environment information acquiring unit that acquires environment information unique to a current location;
a reception information acquiring unit that acquires reception information indicating a state of the positioning signal at the current location based on the environment information; and
an operation condition setting unit that sets an operation condition, under which the satellite positioning unit searches for the positioning satellite, based on the reception information.

The present disclosure contains subject matter related to that disclosed in Japanese Priority Patent Application JP 2011-230984 filed in the Japan Patent Office on Oct. 20, 2011, the entire content of which is hereby incorporated by reference.

What is claimed is:
1. An information processing apparatus, comprising:
a satellite positioning unit configured to determine a position of the information processing apparatus based on a plurality of positioning signals, wherein a positioning signal of the plurality of positioning signals is received from a positioning satellite; and
a system control unit configured to:
acquire environment information, wherein the environment information specifies a current location of the information processing apparatus;
acquire reception information from a server based on the environment information and terminal information, wherein the terminal information identifies the information processing apparatus;
set an operation condition of the satellite positioning unit based on the reception information, wherein the satellite positioning unit is further configured to search for the positioning satellite based on the operation condition;
generate a notification comprising the environment information and set the satellite positioning unit in a sleep state for a second time period based on a lapse of a first time period in which the satellite positioning unit fails to determine the position of the information processing apparatus; and
activate the satellite positioning unit based on a lapse of the second period time.

2. The information processing apparatus according to claim 1,
wherein the reception information includes information associated with an azimuth at which the positioning signal is receivable at the current location, and
wherein the satellite positioning unit is further configured to search for the positioning satellite at the azimuth based on the operation condition.

3. The information processing apparatus according to claim 1,
wherein the reception information includes information associated with an elevation angle at which the positioning signal is receivable at the current location, and
wherein the satellite positioning unit is further configured to search for the positioning satellite at the elevation angle based on the operation condition.

4. The information processing apparatus according to claim 1,
wherein the system control unit is further configured to set the operation condition based on a determination that a state of the positioning signal varies at the current location, and
wherein the operation condition is set based on information that indicates at least one of positioning accuracy or power consumption.

5. The information processing apparatus according to claim 1,
wherein the system control unit is further configured to set the operation condition to control the satellite positioning unit, and
wherein the satellite positioning unit is further configured to determine the position based on the reception information that indicates the current location is a location at which the positioning signal is receivable.

6. The information processing apparatus according to claim 1,
wherein the system control unit is further configured to set the operation condition to control the satellite positioning unit,
wherein the satellite positioning unit is further configured to search the positioning signal with a first intensity, and wherein the positioning signal is searched based on the reception information that indicates the current location is a location at which the positioning signal with the first intensity is receivable.

7. The information processing apparatus according to claim 6,
wherein the satellite positioning unit is further configured to re-search the positioning satellite based on the reception information that indicates the current location is a location at which the positioning signal with the first intensity is receivable.

8. The information processing apparatus according to claim 6,
wherein the satellite positioning unit is further configured to search for the positioning signal with a second intensity for a time interval, wherein the second intensity is lower than the first intensity, wherein the positioning signal is searched with a second intensity based on the reception information that indicates the current location is a location at which the positioning signal with the first intensity is receivable.

9. The information processing apparatus according to claim 1,
wherein the system control unit is further configured to set the operation condition to control the satellite positioning unit, and
wherein the satellite positioning unit is further configured to execute a strong-signal search for the positioning signal, wherein the strong-signal search is executed with an intensity based on the reception information that indicates the current location is a location at which the positioning signal with the intensity is receivable.

10. The information processing apparatus according to claim 1,
wherein the system control unit is further configured to acquire the reception information based on one of a name or version of the information processing apparatus as the terminal information, and
wherein the terminal information identifies the information processing apparatus.

11. The information processing apparatus according to claim 1, further comprising:
a reception information collecting unit configured to collect the environment information and the reception information, wherein the reception information indicate a state of the positioning signal at a time of acquisition of the environment information.

12. The information processing apparatus according to claim 1, wherein the system control unit is further configured to acquire the reception information collected by the information processing apparatus.

13. The information processing apparatus according to claim 1, wherein the satellite positioning unit is further configured to determine the position under a standard operation condition based on the operation condition that is set.

14. The information processing apparatus according to claim 1,
wherein the satellite positioning unit is further configured to:
wait for the first time period before the determination of the position, and
determine the position after the operation condition based on the reception information that is set.

15. The information processing apparatus according to claim 1, wherein the system control unit is further configured to acquire the reception information based on the environment information, wherein the environment information is a key stored in the information processing apparatus.

16. The information processing apparatus according to claim 1, wherein the environment information is acquired based on at least one of a Wi-Fi signal, radio frequency identification (RFID) signal, a television signal or a frequency modulation (FM) signal.

17. The information processing apparatus according to claim 1, wherein the system control unit is further configured to control a reception information collecting unit to store the reception information in the information processing apparatus.

18. An information processing method, comprising:
in an information processing apparatus:
acquiring environment information, wherein the environment information specifies a current location of the information processing apparatus;
acquiring reception information, stored in a server, based on the environment information and terminal information, wherein the environment information is a key to specify the reception information and wherein the terminal information identifies the information processing apparatus;

setting an operation condition of a satellite positioning unit to search for a positioning satellite based on the reception information;

determining a position of the information processing apparatus by the satellite positioning unit based on a plurality of positioning signals, wherein a positioning signal of the plurality of positioning signals is received from the positioning satellite under the set operation condition;

generating a notification comprising the environment information and setting the satellite positioning unit in a sleep state for a second time period based on a lapse of a first time period in which the satellite positioning unit fails to determine the position of the information processing apparatus; and activating the satellite positioning unit based on a lapse of the second period time.

19. A non-transitory computer-readable medium having stored thereon, computer-executable instructions which when executed by an information processing apparatus, cause the information processing apparatus to execute operations, the operations comprising:

determining a position of the information processing apparatus based on a plurality of positioning signals, wherein a positioning signal of the plurality of positioning signals is received from a positioning satellite;

acquiring environment information, wherein the environment information specifies a current location of the information processing apparatus;

acquiring reception information from a server based on the environment information and terminal information, wherein the terminal information identifies the information processing apparatus;

setting an operation condition of a positioning apparatus, wherein searching for the positioning satellite is executed based on the reception information;

generating a notification comprising the environment information and setting a satellite positioning unit in a sleep state for a second time period based on a lapse of a first time period in which the satellite positioning unit fails to determine the position of the information processing apparatus; and activating the satellite positioning unit based on a lapse of the second period time.

* * * * *